United States Patent
Wang et al.

(10) Patent No.: US 12,192,340 B2
(45) Date of Patent: Jan. 7, 2025

(54) USING SECURE MPC AND VECTOR COMPUTATIONS TO PROTECT ACCESS TO INFORMATION IN CONTENT DISTRIBUTION

(71) Applicant: Google LLC, Mountain View, CA (US)

(72) Inventors: Gang Wang, Jersey City, NJ (US); Ardian Poernomo, Santa Clara, CA (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 350 days.

(21) Appl. No.: 17/793,831

(22) PCT Filed: Jan. 6, 2022

(86) PCT No.: PCT/US2022/011372
§ 371 (c)(1),
(2) Date: Jul. 19, 2022

(87) PCT Pub. No.: WO2022/150428
PCT Pub. Date: Jul. 14, 2022

(65) Prior Publication Data
US 2023/0076256 A1 Mar. 9, 2023

(30) Foreign Application Priority Data
Jan. 10, 2021 (IL) .......................................... 280056

(51) Int. Cl.
*H04L 9/08* (2006.01)
*G06F 21/62* (2013.01)
(Continued)

(52) U.S. Cl.
CPC .......... *H04L 9/085* (2013.01); *G06F 21/6245* (2013.01); *G06Q 10/10* (2013.01);
(Continued)

(58) Field of Classification Search
CPC .......................... G06F 21/6245; G06Q 10/10; G06Q 30/0241; G06Q 2220/00; H04L 9/0643;
(Continued)

(56) References Cited

U.S. PATENT DOCUMENTS

2010/0037055 A1* 2/2010 Fazio .................... H04L 9/3255
713/171
2016/0180373 A1 6/2016 Xu et al.
(Continued)

FOREIGN PATENT DOCUMENTS

JP 2012-033088 2/2012
JP 2015-532737 11/2015
(Continued)

OTHER PUBLICATIONS

Ardian Poernomo, "Dovekey" submitted on Sep. 23, 2020, <https://github.com/google/ads-privacy/tree/master/proposals/dovekey>, 7 pages.
(Continued)

*Primary Examiner* — Le H Luu
(74) *Attorney, Agent, or Firm* — Fish & Richardson P.C.

(57) ABSTRACT

This disclosure relates to protecting the security of information in content selection and distribution. In one aspect, a method includes receiving, from a client device and by a first computing system of multi-party computation (MPC) systems, a digital component request including first secret shares of data identifying user groups that include a user of the client device as a member. The first computing system transmits a contextual digital component request to a content platform. The first computing system receives, from the content platform, selection data for multiple digital components. The selection data includes first vector data defining a contextual-based vector of values selected based in part on the set of contextual signals. The first computing system
(Continued)

obtains, for each digital component, second vector data defining a user group-based vector of values selected based in part on a respective user group corresponding to the digital component.

20 Claims, 6 Drawing Sheets

(51) Int. Cl.
  *G06Q 10/10* (2023.01)
  *G06Q 30/0241* (2023.01)
  *H04L 9/06* (2006.01)
(52) U.S. Cl.
  CPC ....... *G06Q 30/0241* (2013.01); *H04L 9/0643* (2013.01); *H04L 9/0841* (2013.01); *G06Q 2220/00* (2013.01); *H04L 2209/46* (2013.01)
(58) Field of Classification Search
  CPC ....... H04L 9/0841; H04L 9/085; H04L 9/008; H04L 9/0861; H04L 9/30; H04L 9/3239; H04L 9/3255; H04L 2209/46; H04L 63/068
  See application file for complete search history.

(56) References Cited

U.S. PATENT DOCUMENTS

| | | | | |
|---|---|---|---|---|
| 2017/0223008 | A1* | 8/2017 | Camenisch | ............ H04L 9/085 |
| 2018/0076956 | A1* | 3/2018 | Camenisch | ........... H04L 9/0861 |
| 2018/0219687 | A1* | 8/2018 | Popa | .................... H04L 63/068 |
| 2019/0205568 | A1* | 7/2019 | Veugen | ................... H04L 9/008 |
| 2020/0126143 | A1 | 4/2020 | Chen et al. | |
| 2020/0336313 | A1 | 10/2020 | Knox | |
| 2021/0021606 | A1* | 1/2021 | Gvili | .................... H04L 9/3239 |
| 2021/0160074 | A1* | 5/2021 | Kumaresan | ............... H04L 9/30 |
| 2022/0029796 | A1* | 1/2022 | Peddada | .............. H04L 9/0841 |
| 2022/0414247 | A1* | 12/2022 | Wang | .................... H04L 9/0643 |

FOREIGN PATENT DOCUMENTS

| | | |
|---|---|---|
| JP | 2016-510912 | 4/2016 |
| JP | 2017-010351 | 1/2017 |
| WO | WO 2011007631 | 1/2011 |
| WO | WO 2018135334 | 7/2018 |
| WO | WO 2019063503 | 4/2019 |

OTHER PUBLICATIONS

Chromium.org [online], "The Privacy Sandbox" Aug. 23, 2019, retrieved on Oct. 17, 2022, retrieved from URL <https://www.chromium.org/Home/chromium-privacy/privacy-sandbox/>, 3 pages.
International Search Report and Written Opinion in International Appln. No. PCT/US2022/011372, dated Apr. 20, 2022, 15 pages.
Josh Karlin, "Floc" Submitted on Aug. 22, 2019, <https://github.com/WICG/floc>, 7 pages.
Wikipedia.org [online], "Divide-and-conquer algorithm" Nov. 2, 2020, retrieved on Nov. 2, 2020, retrieved from URL <https://en.wikipedia.org/w/index.php?title=Divide-and-conquer algorithm&oldid=986764364>, 7 pages.
Wikipedia.org [online], "Dot product" Sep. 6, 2020, retrieved on Nov. 2, 2020, retrieved from URL <https://en.wikipedia.org/w/index.php?title=Dot_product&oldid-977064061>, 10 pages.
Wikipedia.org [online], "Separation of concerns" Nov. 1, 2020, retrieved on Nov. 2, 2020, retrieved from URL <https://en.wikipedia.org/w/index.php?title=Separation_of_concerns&oldid=9865140 89>, 6 pages.
Notice of Allowance in European Appln. No. 22702813.1, mailed on Aug. 17, 2023, 9 pages.
International Preliminary Report on Patentability in International Appln. No. PCT/US2022/011372, mailed on Jul. 20, 2023, 10 pages.
Office Action in Israel Appln. No. 280056, dated Jun. 13, 2023, 3 pages.
Notice of Allowance in Japanese Appln. No. 2022-549741, mailed on Nov. 6, 2023, 5 pages (with English translation).
Yao et al., "Private Distributed Scalar Product Protocol with Application to Privacy—Preserving Computation of Trust" Proceedings of IFIPTM, 2007, 16 pages.

* cited by examiner

USING SECURE MPC AND VECTOR COMPUTATIONS TO PROTECT ACCESS TO INFORMATION IN CONTENT DISTRIBUTION

CROSS-REFERENCE TO RELATED APPLICATIONS

This application is a National Stage Application under 35 U.S.C. § 371 and claims the benefit of International Application No. PCT/US2022/011372, filed Jan. 6, 2022, which claims the benefit of priority to Israeli Application Serial No. 280056, filed Jan. 10, 2021. The foregoing applications are incorporated herein by reference in their entirety.

TECHNICAL FIELD

This specification is related to cryptography and data security.

BACKGROUND

Secure multi-party computation (MPC) is a family of cryptographic protocols that prevents access to data by distributing a computation across multiple parties such that no individual party can access another party's data or intermediate computed values, while outputs are released only to designated parties. The MPC computing systems typically perform the computations using secret shares of the data, and sometimes perform computations on encrypted data.

SUMMARY

In general, one innovative aspect of the subject matter described in this specification can be embodied in methods that include receiving, from a client device and by a first computing system of multi-party computation (MPC) systems, a digital component request including first secret shares of data identifying user groups that include a user of the client device as a member and a set of contextual signals; transmitting, by the first computing system, a contextual digital component request to a content platform; receiving, by the first computing system and from the content platform, selection data for a plurality of digital components, wherein the selection data includes first vector data defining a contextual-based vector of values selected based at least in part on the set of contextual signals; obtaining, by the first computing system and for each of the digital components, second vector data defining a user group-based vector of values selected based at least in part on a respective user group corresponding to the digital component; determining, by the first computing system, a selection value for each digital component based on the first vector data and the second vector data; determining, for each digital component, a candidate parameter that indicates whether the respective user group identifier corresponding to the digital component matches a user group that includes the user as a member; generating, based on the selection values and the candidate parameters, a first secret share of a selection result that identifies, from multiple candidate digital components, a given digital component having a highest selection value, wherein each candidate digital component is a digital component for which the candidate parameter for the selection value corresponding to the digital component indicates that the second user group identifier corresponding to the selection value matches a user group that includes the user as a member; and transmitting, to the client device, the first secret share of a selection result identifying the given digital component. Other implementations of this aspect include corresponding apparatus, systems, and computer programs, configured to perform the aspects of the methods, encoded on computer storage devices.

These and other implementations can each optionally include one or more of the following features. In some aspects, determining, by the first computing system, the selection value for each digital component based on the first vector data and the second vector data includes determining a dot product of the contextual-based vector of values for the digital component and the user group-based vector of values.

In some aspects, the first vector data includes first secret shares of the contextual-based vector of values and the second vector data includes first secret shares of the user group-based vector of values. Determining, by the first computing system, the selection value for each digital component based on the first vector data and the second vector data can include collaborating with one or more second computing systems of the plurality of MPC systems to perform a secure MPC process to determine a dot product of the contextual-based vector of values for the digital component and the user group-based vector of values.

In some aspects, the selection value for each digital component is based on a user profile for the user. Determining, by the first computing system, the selection value for each digital component based on the first vector data and the second vector data can include determining a dot product of the contextual-based vector for the digital component, the user group-based vector for the digital component, and a user profile vector for the user profile for the user.

In some aspects, determining the candidate parameter for each selection value includes determining a first secret share of the candidate parameter for each selection value. In some aspects, generating the first secret share of the selection result includes generating an order of the selection values based on a magnitude of each selection value; determining, based on the order of the selection values and the candidate parameter for each selection value, a first secret share of an accumulated value for each selection value; determining, for each selection value, a first secret share of a winner parameter based on (i) the candidate parameter for the selection value and (ii) a result of an equality test that indicates whether the accumulated value for the selection value is a specified value; and determining, as the first secret share of the selection result, a first secret share of a sum of, for each selection value, a product of the winner parameter for the selection value and a digital component information element for the selection value.

In some aspects, determining the first secret share of the accumulated value for each selection value includes, for each individual selection value, determining a quantity of selection values, between a highest selection value and the individual selection value inclusive, that have a candidate parameter that indicates that the second user group identifier corresponding to the selection value matches at least one of the one or more first user group identifiers.

The subject matter described in this specification can be implemented in particular embodiments so as to realize one or more of the following advantages. Using a secure MPC process performed by two or more MPC servers operated by different parties to select digital components based on secret shares of user information ensures that the user information cannot be accessed in cleartext by either MPC server or another party absent unauthorized collusion between the MPC servers.

In a digital component selection process, the MPC servers can select from eligible digital components that satisfy one or more eligibility conditions while preventing the parties from accessing user information in cleartext. The eligibility conditions can include restrictions and guidelines on the manner or frequency of distribution of a digital component, among other factors. The conditions can include user group membership, frequency control, muting, budget, k-anonymity, and/or pacing constraints.

A client device of a user can generate a probabilistic data structure, e.g., a cuckoo filter, that represents user groups that includes the user as a member and generate distributed points functions, one per user group that includes the user as a member. The distributed point functions are secret shares that cryptographically represent whether the user is a member of a user group. Using probabilistic data structures and/or distributed point functions in this way protects user privacy by preventing access to the user's group membership and reduces the size of the information provided to the MPC cluster. This reduction in data size reduces the amount of bandwidth consumed to transmit the information, reduces the latency in transmitting the information, and reduces the amount of processing power and associated battery power for devices running on batteries (e.g., mobile devices) required to transmit the information.

The MPC cluster can transmit secret shares of a result that identifies a selected digital component that the MPC cluster selected using the secure MPC process. By sending secret shares of a result for only selected digital components rather than information for all or a large set of digital components similarly reduces consumed bandwidth, latency, processing power, and battery power in transmitting and receiving the result. This also reduces the potential leakage of confidential information of content platforms that submit selection values for digital components to the MPC cluster by limiting the number of digital components for which information is provided to the client device.

The selection values and information regarding their corresponding digital components can be stored in a data structure using a set of contextual signals as a key for each selection value. However, this can result in a large number of keys for selection values that are only eligible in very specific contexts. For example, a content platform may want to use a different selection value for each of many different contexts. Using a vector of values generated based on contextual signals and a vector of values generated for a user group to determine a selection value for a digital component, vector computations can be used to substantially reduce the amount of data stored in the data structure, thereby reducing the data storage requirements for storing many different selection values for many different contexts. The vector computations also enable more flexibility in specifying selection values accurately for various digital component presentation contexts, while also enabling the enforcement of publisher controls on which digital components can be presented with publishers' content. The vector computations can be performed using secret sharing such that a vector of values based on a user profile can be used to determine the selection value, without exposing user information to the MPC cluster or other parties.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for protecting the security of information in content selection and distribution. An MPC cluster of server computers can perform a secure MPC process to select digital components based on user information without either MPC server being able to access the user information in cleartext absent unauthorized collusion. The user information can be sent to the MPC cluster using probabilistic data structures, e.g., cuckoo filters, to reduce the data size of the information being transmitted over a network and to keep the information secure during the transmission.

The MPC cluster can determine selection values for digital components using vector computations, e.g., vector dot product computations. For example, the MPC cluster can determine a selection value for a digital component by determining a dot product between a vector of values generated for a user group for the digital component and a vector of values generated based on contextual signals for a digital component presentation environment. A selection value can indicate an amount that a digital component provider is willing to provide for presentation or user interaction with the digital component.

Figure 1:
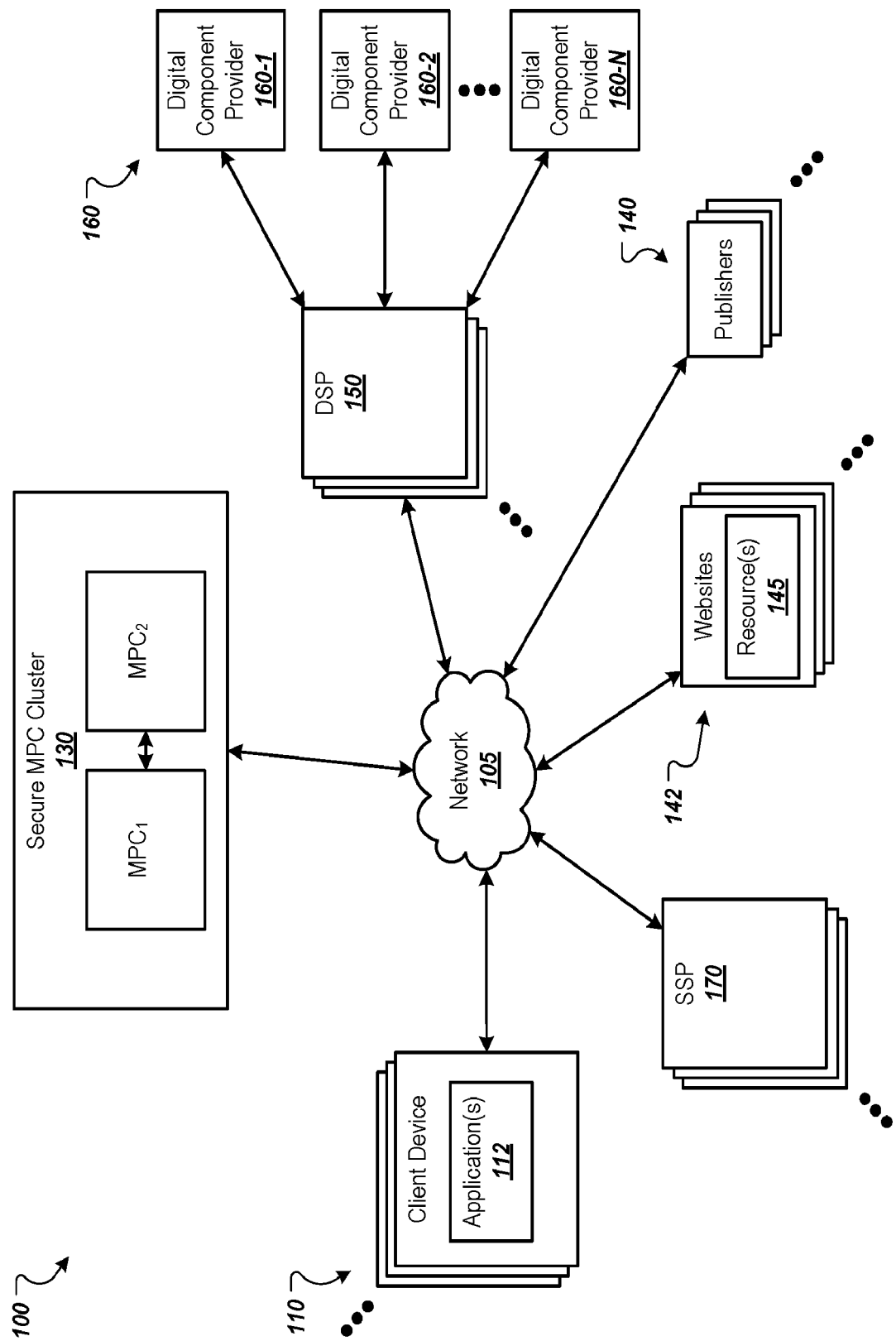
FIG. 1 is a block diagram of an environment in which an MPC cluster performs a secure MPC process to select digital components for distribution to client devices.

FIG. 1 is a block diagram of an environment 100 in which an MPC cluster performs a secure MPC process to select digital components for distribution to client devices 110. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, content platforms, e.g., supply-side platforms (SSPs) 170 and demand-side platforms DSPs (150). The example environment 100 may include many different client devices 110, secure MPC clusters 130, publishers 140, websites 142, DSPs 150, and SSPs 170.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110. As described below, the application 112 can request digital components from the MPC cluster 130 and/or one or more SSPs 170.

Some publishers 140 use an SSP 170 to manage the process of obtaining digital components for digital component slots of its resources and/or applications. An SSP 170 is a technology platform implemented in hardware and/or software that automates the process of obtaining digital components for the resources and/or applications. Each publisher 140 can have a corresponding SSP 170 or multiple SSPs 170. Some publishers 140 may use the same SSP 170.

Digital component providers 160 can create (or otherwise publish) digital components that are presented in digital component slots of publisher's resources and applications. The digital component providers 160 can use a DSP 150 to manage the provisioning of its digital components for presentation in digital component slots. A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources and/or applications of multiple different publishers 140. In general, a DSP 150 can receive requests for digital components (e.g., from an SSP), generate (or select) a selection value for one or more digital components created by one or more digital component providers based on the request, and provide data related to the digital component (e.g., the digital component itself) and the selection parameter to an SSP. The selection value can indicate an amount that the digital component provider 160 is willing to provide for presentation or user interaction with the digital component. The SSP can then select a digital component for presentation at a client device 110 and provide, to the client device 110, data that causes the client device 110 to present the digital component.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users, or other group types involving similar user data, when the users visit particular resources or perform particular actions at the resource (e.g., interact with a particular item presented on a web page or add the item to a virtual cart). The user groups can be generated by the digital component providers 160. That is, each digital component provider 160 can assign users to their user groups when the users visit electronic resources of the digital component providers 160. The user groups can also be created by the content platforms, e.g., by DSPs 150 and/or SSPs 170.

To protect user privacy, a user's group membership can be maintained at the user's client device 110; e.g., by one of the applications 112, or the operating system of the client device 110, rather than by a digital component provider, content platform, or other party. In a particular example, a trusted program (e.g., a web browser or the operating system can maintain a list of user group identifiers ("user group list") for a user using the web browser or another application (e.g., for a user logged into the browser, application, or the client device 110). The user group list can include a group identifier for each user group that includes the user as a member. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 presents a resource or application content related to a digital component provider 160, or a web page on a website 142, the resource can request that the application 112 add one or more user group identifiers to the user group list. In response, the application 112 can add the one or more user group identifiers to the user group list and store the user group list securely.

The MPC cluster 130 can use the user group membership of a user to select digital components or other content that may be of interest to the user or may be beneficial to the user/user device in another way. For example, such digital components or other content may include data that improves a user experience, improves the running of a user device or benefits the user or user device in some other way. However, the user group identifiers of the user group list of a user can be provided and used to select digital components in ways that prevent the computing systems $MPC_1$ and $MPC_2$ of the MPC cluster 130 from accessing the user group identifiers for the user in cleartext, thereby preserving user privacy when using user group membership data to select digital components. Cleartext is text that is not computationally tagged, specially formatted, or written in code, or data, including binary files, in a form that can be viewed or used without requiring a key or other decryption device, or other decryption process.

The secure MPC cluster 130 includes two computing systems $MPC_1$ and $MPC_2$ (e.g., server computers) that perform secure MPC processes to select digital components for distribution to client devices of users based on the user's group membership, but without accessing the group membership information in cleartext. Although the example MPC cluster 130 includes two computing systems, more computing systems can also be used as long as the MPC cluster 130 includes more than one computing system. For example, the MPC cluster 130 can include three computing systems, four computing systems, or another appropriate number of computing systems. Using more computing systems in the MPC cluster 130 can provide more security, but can also increase the complexity of the MPC processes.

The computing systems $MPC_1$ and $MPC_2$ can be operated by different entities. In this way, each entity may not have access to the complete user profiles in cleartext. For example, one of the computing systems $MPC_1$ or $MPC_2$ can be operated by a trusted party different from the users, the publishers 140, the DSPs 150, the SSPs 170, and the digital component providers 160. For example, an industry group, governmental group, or browser developer may maintain and operate one of the computing systems $MPC_1$ and $MPC_2$. The other computing system may be operated by a different one of these groups, such that a different trusted party operates each computing system $MPC_1$ and $MPC_2$. Preferably, the different parties operating the different computing systems $MPC_1$ and $MPC_2$ have no incentive to collude to endanger user privacy. In some implementations, the computing systems $MPC_1$ and $MPC_2$ are separated architecturally and are monitored to not communicate with each other outside of performing the secure MPC processes described in this document.

Each computing system $MPC_1$ and $MPC_2$ can store vectors of values for determining selection values for digital components. For example, the computing systems $MPC_1$ and $MPC_2$ can cache vectors previously received from SSPs 170 and/or DSPs 150 as part of previous digital component selection processes. In this way, the MPC cluster 130 can use the vectors to select digital components for distribution to client devices 110 in response to future user group-based digital component requests received from client devices 110.

The computing systems $MPC_1$ and $MPC_2$ can store a user group-based vector of values $V_{ug}$ for a digital component, e.g., a digital component that is to be provided to users that are members of the user group. The values can be floating point values or values of a different computer number format. Such a user group-based vector $V_{ug}$ can be used to determine a selection value for the digital component for use in digital component selection processes for selecting a digital component to distribute for presentation to users in the user group. The user group-based vector $V_{ug}$ can include multiple elements across two or more dimensions and each element can represent a particular feature of a digital component presentation opportunity. For example, the user group-based vector of values $V_{ug}$ can include elements for geographic locations or regions, spoken languages, ages or age ranges, particular URLs of web pages or other electronic resources, particular products or services, whether a digital component slot is above or below the fold, the type of digital component slot, the size of the digital component slot, the number of digital component slots on the electronic resource, the time of day, web property identifier, and/or other appropriate features of digital component presentation opportunities. In some implementations, e.g., implementations that adopt neural networks, the user group-based vector $V_{ug}$ can be an embedding of the user group in some abstract vector space.

The value of each element can reflect an amount to increase or decrease a selection value for the digital component based on a current digital component presentation opportunity having the feature corresponding to the element. For example, if a DSP 150 wants the digital component to be presented to users in Atlanta, but not users in Dallas, the value for an element for Atlanta can be a positive value above a value of one, and the value for an element for Dallas can be a positive value below one, e.g., zero, or a negative value. As described in more detail below, these values can be part of a vector dot product computation to determine a selection value for the digital component.

In some implementations, each computing $MPC_1$ and $MPC_2$ stores the user group-based vector of values $V_{ug}$ for digital components using a two stage lookup table (LUT). Using a two stage LUT can provide some performance advantages, but other appropriate data structures can also be used. The first stage can be keyed by a user group request key (UG_Request_Key). The UG_Request_Key can be a composite message that is based on a set of contextual signals, e.g., a set of contextual signals of a digital component request (e.g., URL, location, language, etc.) or a set of contextual signals for which a digital component is eligible for distribution. That is, the first stage LUT can be keyed based on a set of contextual signals. The key for the first stage can be a hash of the UG_Request_Key, e.g., using a hash function such as SHA256. This key can be truncated to a specified number of bits, e.g., to 16 bits, 32 bits, or another appropriate number of bits. The value for each key UG_Request_Key in the first stage LUT can indicate the rows of the second stage LUT that includes data for digital components that are eligible for digital component requests that include the contextual signals of the UG_Request_Key. An example first stage LUT is shown below as Table 1.

TABLE 1

| Key | Value |
|---|---|
| SHA256(UG_Request_Key) | Rows . . . |
| . . . | Rows . . . |

The second stage LUT can be keyed based on a combination of the user group request key UG_Request_Key in the first stage LUT and a user group identifier. Each row in the second stage LUT can be for a particular selection value for a particular digital component. For example, a DSP 150 can submit different selection values for the same digital component, with each selection value being for a different set of contextual signals, and/or different user group identifiers. Thus, the selection values for a digital component can vary based on context and other factors.

A DSP 150 or digital component provider 160 can associate, e.g., link or map, a digital component to a user group to which the DSP 150 or digital component provider wants the digital component to be presented. For example, a DSP 150 may want a digital component related to men's basketball shoes to be presented to men that have shown an interest in basketball and/or shoes. In this example, the DSP 150 can provide, to the MPC cluster 130, data indicating that the digital component corresponds to the user group identifier for a user group that includes men that have shown an interest in basketball and/or shoes.

In some implementations, the key for a row in the second stage LUT can be a hash or code generated based on the combination of the user group request key UG_Request_Key and the user group identifier for the digital component of the row. For example, the key can be a hash-based message authentication code (HMAC) of the combination, which can be represented as $HMAC_{SHA256}$(UG_Request_Key, ug_id). The user group identifier ug_id can be based on a combination of an internal user group identifier for the user group and a domain of the owner of the user group (e.g., of the DSP, SSP, or digital component provider that owns the user group). For example, the user group identifier ug_id can be an HMAC of the eTLD+1 of the owner domain and the owner's internal user group identifier for the user group. The eTLD+1 is the effective top-level domain (eTLD) plus one level more than the public suffix. An example eTLD+1 is "example.com" where ".com" is the top-level domain. The ug_id can be truncated to 16 bytes or another appropriate data size.

Continuing the previous men's basketball shoes example, the second stage lookup key for the row that includes information for the digital component that is to be presented to users in the men's basketball shoes group can be a combination of the user group request key UG_Request_Key and the user group identifier ug_id for the men's basketball shoes group. As the digital component can be presented in different contexts, the second stage lookup table can include multiple rows for the digital component associated with the user group identifier ug_id for the men's basketball shoes group, each with different user group request key UG_Request_Key and different values.

The value for each row of the second stage LUT can be the user group-based vector $V_{ug}$ for the digital component and other data for the digital component, e.g., metadata that identifies the digital component or the network location from which the digital component can be downloaded, etc. An example second stage LUT is shown below as Table 2.

TABLE 2

| Key | Value |
|---|---|
| HMAC(UG_Request_Key, UG_ID) | {$V_{ug}$, metadata} |
| ... | ... |

The second stage LUT maps a user group-based vector $V_{ug}$ to a particular digital component, to a particular user group identifier ug_id, and to a particular set of contextual signals defined by the first stage lookup key UG_Request_Key. By doing so, the second stage LUT indicates the particular context of a digital component slot for which the user group-based vector $V_{ug}$ for the digital component is eligible. As the user group-based vector $V_{ug}$ defines the selection value based on a combination of potentially a large number of features of digital component presentation opportunities, the number of contextual signals of the first stage lookup key UG_Request_Key can be minimal, e.g., to specify particular resources with which the digital component can be presented. This reduces the number of rows in the table needed to specify particular selection values for particular contexts.

When a digital component request is received that indicates that the user to which the digital component will be presented is a member of a particular user group identified by a particular user group identifier ug_ig and the digital component will be presented in a particular context defined by the contextual signals of the first stage lookup key, any digital component that has a matching user group identifier and a matching first stage lookup key is a candidate for being selected for distribution in response to the request. Although a two stage LUT is used in this example, other appropriate data structures can also be used.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
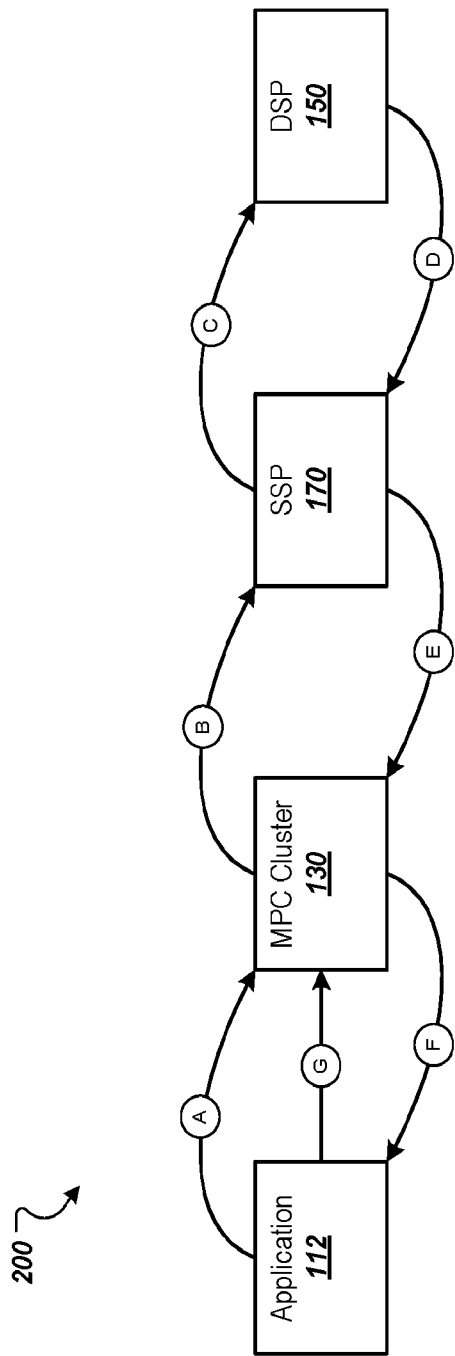
FIG. 2 shows an example data flow within the environment of FIG. 1.

FIG. 2 shows an example data flow 200 within the environment of FIG. 1. In stage A, the application 112 transmits a digital component request to the MPC cluster 130. The digital component request can be for a digital component to present in a digital component slot of content to be presented by the application 112.

The request can include data about the user group membership of a user using the application 112, e.g., in secret shares as described below, and contextual signals of the digital component slot. The contextual signals can describe the digital component presentation opportunity, by including signals such as the geographic location of the client device 110, the spoken language used by the application 112, the URL of the content that includes the digital component slot, whether the digital component slot is above or below the fold, the type and/or size of the digital component slot, the current time of day at the location of the client device 110, the web property identifier for the content, and/or other appropriate features.

The request can also include a first-party cookie for the publisher of the content that includes the digital component slot, if the application 112 supports cookies. This can enable the SSP 170 and/or DSP 150 to use additional user data in selecting a digital component for consideration for presentation in the digital component slot.

If supported by the application 112, the request can also include a cohort identifier for a cohort of users that includes the user of the application 112 as a member. This cohort identifier is a low entropy (e.g., 16-20 bits) identifier for a cohort of users that are determined, e.g., at each device without sharing information from the device, to have similar cross-domain browsing patterns. This can enable the SSP 170 and/or DSP 150 to infer additional information about the user of the application 112.

In stage B, the MPC cluster 130 transmits a contextual digital component request to the SSP 170 for the publisher of the content that includes the digital component slot. This request can include the contextual signals, the first-party cookie, and/or the cohort identifier. This request does not include the user group membership data.

In stage C, the SSP 170 sends the contextual digital component request to one or more DSPs 150. In stage D, the DSP 150 generates and transmits digital component selection data to the SSP 170. This selection data can include a context-based vector $V_{context}$ generated by the DSP 150 based on the information included in the contextual digital component request, e.g., based on the contextual signals and use information obtained or inferred based on the first-party cookie and/or the cohort identifier.

For each DSP 150, its context-based vector $V_{context}$ can have the structure of its user group-based vector $V_{ug}$ stored by the MPC cluster 130. This enables the MPC cluster 130 to perform a dot product computation to determine a selection value for a digital component corresponding to the user group for the each user group-based vector $V_{ug}$ of the DSP 150. For example, the context-based vector $V_{context}$ for a DSP 150 can have the same dimensions and features as each of its user group-based vectors $V_{ug}$. However, the DSP 150 can determine the values of the context-based vector $V_{context}$ based on the information in the contextual digital component request to generate a custom selection value for the digital component request. For a given contextual digital component request, each DSP 150 can provide a single context-based vector $V_{context}$ for use in determining selection values for each of its digital components for which a user group-based vector Vug is stored at the MPC cluster 130.

In addition to providing the context-based vector $V_{context}$, a DSP 150 can provide one or more conditional selection values or vectors to be stored at the MPC cluster 130 for current or future digital component requests. For example, the DSP 150 can piggyback, onto the response, a new or updated user group-based vectors $V_{ug}$ for storage at the MPC cluster 130. With each user group-based vector $V_{ug}$, the DSP 150 can provide other data for storage at the MPC cluster 130, such as user group request key UG_Request_Key for the vector and/or metadata for the vector. The vectors can be split into secret shares and/or digitally signed by the DSP 150 prior to sending to the SSP 170 to protect user privacy, protect business confidential information, prevent the computing systems MPC₁ and MPC₂ from accessing the information in cleartext, and/or to prevent man-in-the-middle attacks or eavesdropping (e.g., between the DSP 150 and SSP 170 or other partners between them, but not shown in FIG. 2).

A DSP 150 can also provide an unconditional selection value (e.g., not conditioned on user group membership and other sensitive information not present in Stage B and Stage C) and data for a digital component for consideration as the digital component selected to be presented at the client device 110 in response to the digital component request. Such a digital component can be provided just for the current digital component request, rather than be stored by the MPC cluster 130 for future digital component requests.

In stage E, the SSP 170 transmits the vectors and/or selection values received from the DSP(s) 150 to the MPC cluster 130. As described in more detail below, prior to transmitting the vectors and/or selection values to the MPC cluster 130, the SSP 170 can apply publisher controls to the vectors and/or selection values. In some implementations, the SSP 170 can modify the vectors and/or selection values to account for sharing arrangements prior to sending the vectors and/or selection values to the MPC cluster 130.

Figure 4:
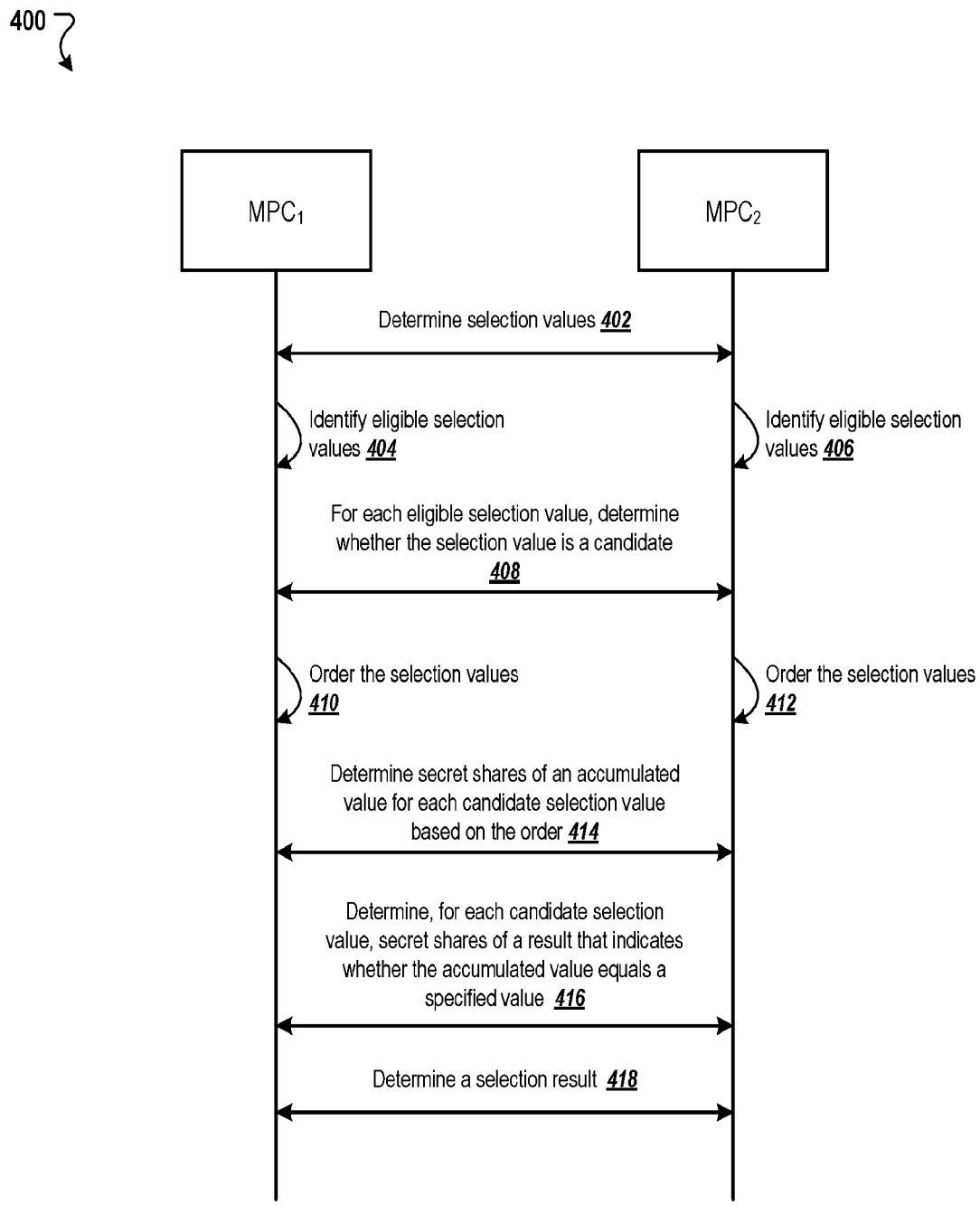
FIG. 4 is a swim lane diagram of an example process for selecting a digital component for distribution to a client device.

In stage F, the MPC cluster 130 performs a digital component selection process and transmits a selection result to the application 112. An example selection process is illustrated in FIG. 4 and described below. The MPC cluster 130 can also store user group-based vectors $V_{ug}$ and associated metadata/keys related to the corresponding digital components for use in subsequent digital component selection processes.

In stage G, the application 112 transmits a notification to the MPC cluster 130. The notification can identify the digital component presented by the application and/or include data indicating whether the digital component was interacted with, e.g., selected, by the user of the application 112. In some implementations, the notification in Stage G can piggyback on digital component requests in the near future in Stage A. Such piggyback reduces the number of requests sent by Application 112 and may reduce network and battery consumption by Application 112.

Figure 3:
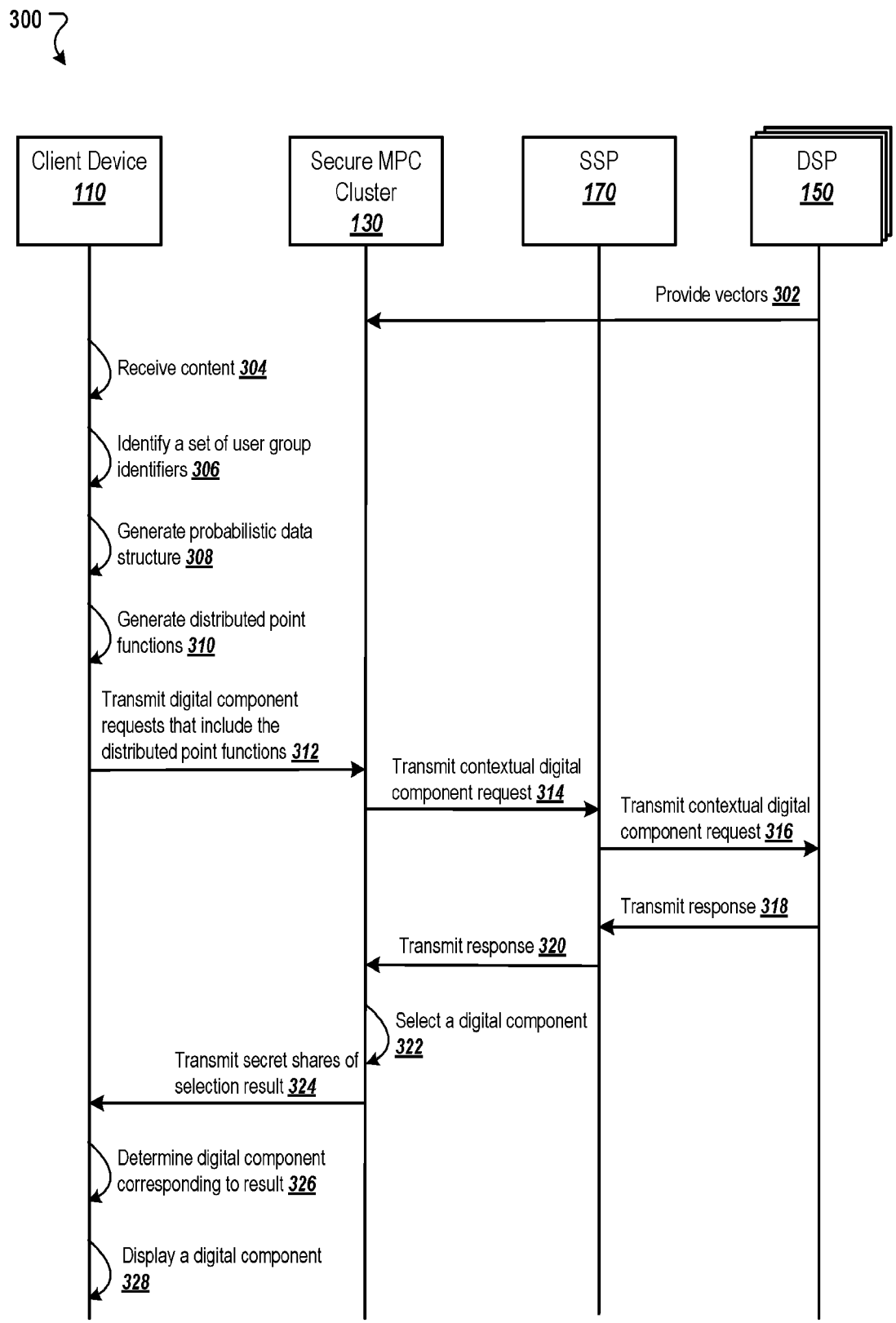
FIG. 3 is a swim lane diagram of an example process for selecting a digital component for presentation at a client device.

FIG. 3 is a swim lane diagram of an example process 300 for selecting a digital component for presentation at a client device. Operations of the process 300 can be implemented, for example, by the client device 110, the computing systems MPC₁ and MPC₂ of the MPC cluster 130, and DSPs 150. Operations of the process 300 can also be implemented as instructions stored on one or more computer readable media which may be non-transitory, and execution of the instructions by one or more data processing apparatus can cause the one or more data processing apparatus to perform the operations of the process 300. Although the process 300 and other processes below are described in terms of a two computing system MPC cluster 130, MPC clusters having more than two computing systems can also be used to perform similar processes. In addition, operations of the process 300 can be implemented by SSPs 170.

The DSPs 150 provide user group-based vectors $V_{ug}$ for digital components to the MPC cluster 130 (302). For example, the DSPs can provide the user group-based vectors Vug for digital components to the MPC cluster 130 via the SSP 170. As described above, the DSPs 150 can provide the user group-based vectors $V_{ug}$ along with, e.g., piggybacked onto a response that includes, context-based vectors context. However, the user group-based vectors $V_{ug}$ can be one of two inputs to the dot product calculation for future digital component requests, while the context-based vectors $V_{context}$ is one of the two inputs to the dot product calculation for the current digital component request. The MPC cluster 130 can store the user group-based vectors $V_{ug}$ together with corresponding digital component and/or its related metadata for future digital component requests received from client devices 110. In another example, the DSPs 150 can provide the user group-based vectors $V_{ug}$ for digital components outside of digital component requests, e.g., based on generating a new or updated user group-based vectors $V_{ug}$.

For each digital component, a DSP 150 can also upload additional data, e.g., metadata, for the digital component.

The additional data for a digital component can include a user group identifier for a user group corresponding to the digital component. The data for a digital component can also include a user group request key UG_Request_Key that is based on a set of contextual selection signals that indicate the context for which the digital component is eligible, e.g., location of client device 110, spoken language selected for the application 112, Universal Resource Locators (URL) for resources with which the digital component can be presented. The MPC cluster 130 caches, or otherwise stores, the user group-based vectors $V_{ug}$ for digital components provided to the MPC cluster 130 for future digital component requests. As described above, the data can be stored in a two-stage LUT or other suitable data structures.

The client device 110 receives content (304). For example, the client device 110 can receive an electronic resource (e.g., web page) for presentation by a web browser or application content for presentation by a native application. The content can include one or more digital component slots that include computer-readable code, e.g., scripts, that, when executed, cause the client device 110 to request a digital component for each slot. The client device 110 can render the content on a display of the client device 110.

The client device 110 identifies a set of user group identifiers (306). The set of user group identifiers can be the user group identifiers for the user groups that include the user as a member. For example, the set of user group identifiers can be the user group identifiers in the user group list. The application 112 that renders the content or a trusted program can identify the set of user group identifiers, e.g., by accessing the user group list from secure storage of the client device 110.

To protect the privacy of the user such that the computing systems of the MPC cluster 130 cannot access the user group identifiers for a user, the application 112 can send respective secret shares of the user group identifiers to each computing system of the MPC cluster 130. In this example, the application 112 sends distributed point functions that represent secret shares of the user identifiers. However, other appropriate secret sharing techniques can be used, including sending a cuckoo filter to the MPC cluster 130 as described below.

The application 112 or the trusted program can generate the probabilistic data structure using the set of user group identifiers (308). In some implementations, the probabilistic data structure is a cuckoo filter with tables using two hash functions F1 and F2. Cuckoo hashing is a hashing method that uses two (or more) tables with a total (1+\epsilon)N entries to store N items, e.g., user group identifiers, such that each entry will contain at most one item. In addition, each item, e.g., user group identifier, will appear in one of two entries defined by one of two hash functions F1 and F2 whose output is the set [(1+\epsilon)N]. An item associated with key k will appear at either location F1(k) in the first table or F2(k) in the second table. For reasonably large N items (e.g., N≥1,000), it is sufficient to use \epsilon=0.1, which means that N items can be hashed with cuckoo hashing where the combined table size is 1.1N. In these expressions, epsilon can be referred to as a load factor.

To build a sparse private information retrieval data structure using a cuckoo filter, up to N user group identifiers are hashed using cuckoo hashing into two tables (or more), which have a combined size of 1.1N or another appropriate size. All empty entries can be replaced with a 0-bit string. To query for an user group identifier associated with key k, the user group identifier (if it exists in the data structure) will appear at entry F1(k) in the first table or F2(k) in the second table. Using table size C=1.1N would result in 1≤F1(ug_id), F2(ug_id)≤C.

The client device 110 can generate the cuckoo filter by calculating, for each user group identifier in the set of user group identifiers, both possible locations for the user group identifier using both hash functions F1 and F2. If at least one of the two possible locations is empty, the client device 110 can insert the element into the empty location, which could be in either table, to complete the insertion process for that user group identifier. If both locations are occupied, the client device 110 randomly picks one location and swaps the item currently in the location with the item to be inserted. The client device 110 can then recalculate the two hash functions F1 and F2 and try the insertion again. This process repeats until the insertion is successful or too many attempts have failed for each user group identifier in the set of user group identifiers. After the cuckoo filter is constructed, each user group identifier ug_id is stored in a specific index of the table.

The client device 110 generates distributed point functions (310). The application 112 or the trusted program can generate the distributed point functions using point functions and the cuckoo filter tables. The distributed point functions represent secret shares of the point function. In general, point functions are functions $f^i$: [N] [N] where $f(x)=0$ when $x!=i$ and $f(i)=1$. A secret sharing of a point function $f^i$ is two functions $g^i$: [N]→[N] and $h^i$: [N]→[N] such that $f^i(x)=g^i(x)+h^i(x)$ for all x in the set [N]. Furthermore, given specifications of the function $h^i$ or $g^i$ (but not both), it is impossible to recover the original function $f^i$.

For each ug_id, a point function $G_{ug\_id}$ id is needed that can be split into distributed point functions $g_{ug\_id,1}$ and $g_{ug\_id,2}$ such that, for $\forall j \in [1, C]$, relationships 1 and 2 below are satisfied.

$$G_{ug\_id}(i)=g_{ug\_id,1}(i)g_{ug\_id,2}(i)=\text{ug\_id if } i=F_1(\text{ug\_id}) \quad (1)$$

$$G_{ug\_id}(i)=g_{ug\_id,1}(i)g_{ug\_id,2}(i)=0 \text{ otherwise} \quad (2)$$

Similarly, a point function $H_{ug\_id}$ is needed that can be split into distributed point functions $h_{ug\_id,1}$ and $h_{ug\_id,2}$ such that, for $\forall j \in [1, C]$, relationships 3 and 4 below are satisfied.

$$H_{ug\_id}(i)=h_{ug\_id,1}(i)h_{ug\_id,2}(i)=\text{ug\_id if } i=F_2(\text{ug\_id}) \quad (3)$$

$$H_{ug\_id}(i)=h_{ug\_id,1}(i)+h_{ug\_id,2}(i)=0 \text{ otherwise} \quad (4)$$

That is, the distributed point functions of a particular point function can be evaluated on multiple possible points, e.g., multiple possible user group identifiers, but the result is always zero except for the user group identifier ug_id for the user group that includes the user as a member and for which the distributed point functions were generated. The distributed point functions have a very small data size that can be transmitted over a network without using much bandwidth and with low latency compared with sending other encrypted forms of user group identifiers.

For a given user group identifier, ug_id, point function $F_1$ and the corresponding first table of the cuckoo filter, the client device 110 generates a distributed point function $g_{ug\_id,1}$ for computing system $MPC_1$ and a distributed function $g_{ug\_id,2}$ for computing system $MPC_2$. Similarly, for a given user group identifier, ug_id, point function F2 and the corresponding second table of the cuckoo filter, the client device 110 generates a distributed point function $h_{ug\_id,1}$ for computing system $MPC_1$ and a distributed point function $h_{ug\_id,2}$ for computing system $MPC_2$.

The client device 110 transmits, to the MPC cluster 130, a digital component request (312). The digital component request can include the distributed point functions. The client device 110 can transmit a digital component request that includes each distributed point function $g_{ug\_id,1}$ and each distributed point function $h_{ug\_id,1}$ to computing system $MPC_1$. The digital component request can include the first stage lookup key, e.g., SHA256(UG_Request_Key). The client device 110 can generate the first stage lookup key based on contextual signals for the digital component request. For example, the client device 110 can generate the first stage lookup key by generating a composite message that includes contextual signals, such as the URL of the resource with which a selected digital component will be presented, the location of the client device 110 submitting the digital component request, the spoken language of the application 112 that will present a selected digital component, etc. The client device 110 can then apply a hash function, e.g., an SHA256 function, to the composite message to generate the first stage lookup key.

Similarly, the client device 110 can transmit a digital component request that includes each distributed point function $g_{ug\_id,2}$ and each distributed point function $h_{ug\_id,2}$ to computing system $MPC_2$. This digital component request can also include the first stage lookup key, e.g., SHA256 (UG_Request_Key). As the contextual signals are the same, the first stage lookup key can be the same for the digital component requests sent to the two computing systems $MPC_1$ and $MPC_2$ of the MPC cluster 130.

The computing system $MPC_1$ can create a vector of additive secret shares $[M_1]=[m_{l,1}, \ldots m_{C,1}]$, where $m_{i,1}=g_{ug\_id1}(i)$ for $1 \le i \le C$. Brackets are used in this document to represent secret shares of a secret. Similarly, computing system $MPC_2$ can create a vector of additive secret shares $[M_2]=[m_{l,2}, \ldots m_{C,2}]$, where $m_{i,2}=g_{ug\_id,2}(i)$ for $1 \le i \le C$. In this example, secret share $[M_{i,1}]$ and $[m_{i,2}]$ are additive secret shares of $G_{ug\_id}(i)$ and $[M_1]$ and $[M_2]$ are two additive secret shared of M, i.e., vector of dimension C, where $M_i=G_{ug\_id}(i)$. The secret shares can be generated using Shamir's secret sharing or another appropriate secret sharing technique. The computing systems $MPC_1$ and $MPC_2$ can generate similar vectors for the point functions $h_{ug\_id,1}(i)$ and $h_{ug\_id,1}(i)$.

The digital component request sent to at least one of the computing systems $MPC_1$ and/or $MPC_2$ can include a contextual digital component request. As described above, a contextual digital component request can include the contextual signals for the digital component presentation opportunity, the first-party cookie, and/or the cohort identifier. In this case, the contextual signals can include the URL of an electronic resource that includes the content, the location of the client device 110, the spoken language of the application 112, etc.

The MPC cluster 130 transmits the contextual digital component request to the SSP 170 (314). The SSP 170 transmits the contextual digital component request to one or more DSPs 150 (316). The DSP 150 can generate a context-based vector $V_{context}$ based on the information included in the contextual digital component request and transmit a response that includes the context-based vector $V_{context}$ to the SSP 170 (318). As described above, the DSP 150 can also provide new or updated user group-based vectors $V_{ug}$ for the current digital component selection process and/or to be stored at the MPC cluster 130 for future digital component selection processes.

In some implementations, the response from a DSP 150 can include an unconditional selection value for a digital component selected based on the contextual signals and/or other information included in the contextual digital component request. This can be in addition to, or in place of, the context-based vector $V_{context}$. For example, these digital components can be selected for the current digital component request, but not for caching at the MPC cluster 130.

The SSP 170 transmits the response(s) from the DSPs 150 to the MPC cluster 130 (320). In some implementations, the SSP 170 can enforce publisher controls on the responses prior to transmitting them to the MPC cluster 130. Such publisher controls can filter digital components from consideration if they have features that the publisher of the content has excluded. Such publisher controls can also filter digital components received from digital component providers that the publisher has excluded.

In some implementations, the SSP 170 can also adjust the vectors and/or selection values based on sharing agreements between the publisher, SSP 170, and/or DSP 150 prior to sending the vectors and/or selection values to the MPC cluster 130. The result of this is the final amount that would be provided to the publisher from an overall selection value that the digital component provider 160 will provide for presentation or user interaction with the digital component. In one example, the SSP 170 can multiply the user group-based vector $V_{ug}$ by a value (1-share) to obtain a result vector $V_{ug}'$. The parameter share can represent a percentage of the selection value computed using the vector $V_{ug}$ that would be provided to the SSP 170 and/or the DSP 150. The parameter share can vary across digital components based on the provider's agreements with the SSP 170 and/or DSP 150. In this example, the result vector $V_{ug}'$ can be stored by the computing systems $MPC_1$ and $MPC_2$ and used multiple times as long as the stored vector and its digital component remain active for digital component selection processes.

In another example, the SSP 170 can multiply the contextual vector $V_{context}$ by (1-share) to obtain a result vector $V_{context}'$. In this example, the result vector can be stored by the computing systems $MPC_1$ and $MPC_2$ and used for the current digital component selection process. However, as the contextual vector is specific to the current digital component selection process, it may not be used for future digital component selection processes. In another example, the parameter share for each digital component can be stored by the computing systems $MPC_1$ and $MPC_2$ and reused for future digital component selection processes, e.g., to compute the result vectors $V_{ug}'$ and $V_{context}'$.

The MPC cluster 130 performs a digital component selection process to select a digital component to distribute to the client device 110 in response to the digital component request (322). This can include identifying eligible digital components in the two stage lookup table of the computing systems $MPC_1$ and $MPC_2$ using the first stage lookup key. This can also include identifying digital components that are candidates for selection based on the digital components having a user group identifier that matches one of the user group identifiers for the user. This can also include selecting a digital component from the candidate digital components based on the selection values for the digital components. This can all be performed without either computing system $MPC_1$ or $MPC_2$ being able to access the user group identifiers and/or other user data in cleartext. An example process for selecting a digital component using a secure MPC process is illustrated in FIG. 4 and described below.

The MPC cluster 130 transmits secret shares of a selection result to the client device 110 (324). The selection result can be in the form of a byte array that includes information about the selected digital component. For example, the selection result can be a byte array that includes the value for the digital component in the second LUT, e.g., the selection value for the digital component and the metadata for the digital component. The computing systems MPC$_1$ and MPC$_2$ can determine, using the secure MPC process, the secret shares of the selection result, as described in more detail below. The computing system MPC$_1$ can transmit a first secret share of the selection result to the client device 110 and the computing system MPC$_2$ can send a second secret share of the selection result to the client device 110. To prevent the computing systems MPC$_1$ and MPC$_2$ knowing the selected digital component, the computing systems MPC$_1$ and MPC$_2$ can be prevented from sharing their secret shares of the selection result with each other, for example, by encrypting their secret shares using the application's (e.g., browser's) public key.

When a two table cuckoo filter is used, the MPC cluster 130 can provide secret shares of two selection results, one for each table. However, retrieving two user group list selection values for two digital components facilitates selection value scrapping. To reduce this risk, the MPC cluster 130 can use another secure MPC technique to return at most one selection result with the highest selection value, as described below.

The client device 110 determines a digital component that corresponds to the selection result(s) (326). For each selection result for which the client device 110 receives two secret shares from the computing systems MPC$_1$ and MPC$_2$, the client device 110 can determine the selection result from the two secret shares. For example, using an additive secret share library as described in more detail below, the client device 110 can add the two secret shares of the selection result together to obtain the selection result in cleartext. This gives the client device 110 access to the selection value for the digital component and the metadata for the digital component, e.g., the identity of the digital component, the location from which the client device 110 can download the digital component, etc.

The client device 110 can present, e.g., display, a digital component (328), For example, the application 112 can present the digital component with the content received in step 204. In some implementations, the client device 110 can present the digital component of the selection result. If two selection results are received, the client device 110 (e.g., the application 112) can select the digital component having the highest selection value and present the selected digital component.

If a resource includes multiple digital component slots, the client device 110 can request a respective digital component for each slot from the MPC cluster 130 and from the SSP 170. To reduce consumed bandwidth and latency, the client device 110 can transmit the distributed point functions for the user group identifiers once for all of the digital component slots.

Although the steps for generating the cuckoo filter and the distributed point functions are shown in FIG. 3 as being performed after receiving content, the client device 110 can generate the cuckoo filter and the distributed point functions prior to receiving the content. For example, the client device 110 can generate and cache the cuckoo filter and distributed point functions periodically or in response to the user group membership for the user being updated.

FIG. 4 is a swim lane diagram of an example process 400 for selecting a digital component for distribution to a client device. Operations of the process 400 can be implemented, for example, by the computing systems MPC$_1$ and MPC$_2$ of the MPC cluster 130. Operations of the process 400 can also be implemented as instructions stored on one or more computer readable media which may be non-transitory, and execution of the instructions by one or more data processing apparatus can cause the one or more data processing apparatus to perform the operations of the process 400.

The computing systems MPC$_1$ and MPC$_2$ determine selection values for the digital components using the user group-based vector $V_{ug}$ associated with each cached digital component and the contextual vector $V_{context}$ for received in response to a digital component request received from a client device 110 (402). The computing systems MPC$_1$ and MPC$_2$ can determine the selection value for each digital component for which vectors are stored by the computing systems MPC$_1$ and MPC$_2$, e.g., in the two-stage LUT, and any vectors received from the SSP 170 in response to the digital component request received from the client device 110, as described above with reference to FIG. 3.

To determine the selection value for a digital component, the computing systems MPC$_1$ and MPC$_2$ can determine the dot product of the stored vector $V_{ug}$ associated with the digital component and the context-based vector $V_{context}$ received from the DSP 150 for the digital component (and other digital components of the DSP 150) in response to the digital component request. In some implementations, the computing systems MPC$_1$ and MPC$_2$ determine the dot product of one of the vectors, e.g., $V_{context}$ and the result after sharing (e.g., after multiplying by (1-share)) of the other vector, e.g., $V_{ug}'$, depending on the way in which sharing is handled. The result of the dot product is a selection value for the digital component for the corresponding digital component request. If the parameter share is provided to the MPC cluster 130 for the digital component, the value resulting from the dot product computation can be multiplied by (1-share).

In some implementations, the computing systems MPC$_1$ and MPC$_2$ can determine, as the selection value for a digital component, a dot product of three vectors, the contextual vector $V_{context}$ for the digital component, the user group-based vector $V_{ug}$ for the digital component, and a user vector V user representing a user profile of a user of the client device 110 from which the digital component request was received. Each vector can have the same dimensions and the same elements representing the same features. However, each vector can have different values for the elements, depending on the weight of the feature represented by that element. For example, the value for a location element for Austin in the user profile vector can have a positive value if the user is in Austin or a negative value or value of zero if the user is not in Austin; the value for the same location element in the contextual vector can have a positive value if the publisher content currently shown to the user is highly relevant to Austin; the value for the same location element in the user group-based vector for the digital component is positive if the digital component is relevant to Austin. To calculate the dot product of three vectors, the computing systems MPC$_1$ and MPC$_2$ first perform element-wise multiplication among corresponding elements, one from each of the three vectors, then sum the result. For example, assuming that the three vectors are $V_1=\{v_{1,1} \ldots v_{1,n}\}$, $V_2=\{v_{2,1} \ldots v_{2,n}\}$ and $V_3=\{v_{3,1} \ldots v_{3,n}\}$ respectively, the dot-product among the three vectors would be $\Sigma_{i=1}^{n} v_{1,i} \times v_{2,i} \times v_{3,i}$.

The application 112 can generate a user profile for a user, e.g., based on feature vectors received from an SSP 170 or DSPs 150. The application 112 can accumulate the user profile over time and provide, to each computing system $MPC_1$ and $MPC_2$, a respective secret share of the user profile.

In some implementations, the computing systems $MPC_1$ and $MPC_2$ can limit the selection value determined using the two (or three) vectors. In this way, the resultant selection value is not above a first threshold or below a second threshold. For example, the computing systems $MPC_1$ and $MPC_2$ can use a cap function to output a selection value that is between a range between a specified minimum and a specified maximum for the digital component, e.g., as specified by the DSP 150 for the digital component.

In some implementations, the computing systems $MPC_1$ and $MPC_2$ calculate the selection value in cleartext using cleartext vectors, e.g., if user profiles are not used. In some implementations, the computing systems $MPC_1$ and $MPC_2$ use a secure MPC process to calculate the selection values using secret shares of each vector. For example, the SSP 170 or DSP 150 can split the vector derived from sensitive user information into secret shares and provide a respective secret share of the vector to each computing system $MPC_1$ and $MPC_2$. After the computing systems $MPC_1$ and $MPC_2$ calculate secret shares of each selection value, the computing systems $MPC_1$ and $MPC_2$ can reconstruct the selection values, e.g., by adding the secret shares (if the secret shares are additive secret shares) for a selection value together, in cleartext. In implementations that include a user profile vector in the dot product computations, as described below, the secure MPC process is used to protect user privacy by preventing either computing system $MPC_1$ or $MPC_2$ from accessing the user profile in cleartext.

The computing system $MPC_1$ identifies eligible digital components (404). As described above, the digital component request can include, for each user interface group that includes the user of the client device as a member, the distributed point function $g_{ug\_id,1}$ generated by the client device 110 for the user interface group identifier ug_id using the hash function $F_1$. If a two table cuckoo filter is used, the digital component request can also include the distributed point function $h_{ug\_id,1}$ generated by the client device 110 for the user interface group identifier ug_id using the hash function $F_2$. The digital component request can also include the first stage lookup key, e.g., SHA256(UG_Request_Key), generated based on the contextual signals for the digital component request.

The computing system $MPC_1$ can identify the eligible user group-based vectors for the digital components using the first stage lookup key of the digital component request. The computing system $MPC_1$ can access the first stage LUT and use the first stage lookup key to identify the rows of the second stage LUT that include information for a user group-based vector for a digital component that is eligible for presentation, e.g., for which a user group-based vector has been received, for the set of contextual signals represented by the first stage lookup key. For example, as described above, each row of the second stage LUT includes information for a digital component and a second stage lookup key that is based on a set of contextual signals. Thus, the computing system $MPC_1$ can use the first stage lookup key to identify rows of the second stage LUT that have a set of contextual signals that match the set of contextual signals defined by the first stage lookup key received in the digital component request. These rows include information for digital components that are eligible to be presented or have eligible user group-based vectors for the context defined by the first stage lookup key received in the digital component request.

The computing system $MPC_2$ identifies eligible user group-based vectors (406). The computing system $MPC_2$ can identify eligible user group-based vectors for a digital component request received from a client device 110. This digital component request can include, for each user interface group that includes the user of the client device as a member, the distributed point function $g_{ug\_id,2}$ generated by the client device 110 for the user interface group identifier ug_id using the hash function $F_1$. If a two table cuckoo filter is used, the digital component request can also include the distributed point function $h_{ug\_id,2}$ generated by the client device 110 for the user interface group identifier ug_id using the hash function $F_2$. The digital component request can also include the first stage lookup key, e.g., SHA256(UG_Request_Key), generated based on the contextual signals for the digital component request.

The first stage lookup key of the digital component requests received by computing system $MPC_2$ can be the same as the first stage lookup key received by computing system $MPC_1$. Each distributed point function $g_{ug\_id,2}$ can be generated based on the same distributed point function $G_{ug\_id}$ as a corresponding distributed point function received by computing system $MPC_1$. That is, for a user group identifier ud_id for a user group that includes the user as a member, the client device 110 can generate the distributed functions $g_{ug\_id,1}$ and $g_{ug\_id,2}$ of the digital component requests using the hash function $F_1$. Similarly, for a user group identifier ud_id for a user group that includes the user as a member, the client device 110 can generate the distributed functions $h_{ug\_id,1}$ and $h_{ug\_id,2}$ of the digital component requests using the hash function $F_2$.

For brevity, the remaining steps of the process 400 are described in terms of selecting a digital component for distribution to the client device 110 in response to a digital component request in terms of the distributed point functions for the hash function $F_1$. However, the same steps can be performed for the distributed point functions for the hash function $F_2$. This can result in two selected digital components and the MPC cluster 130 can perform additional operations to select one of the two digital components, as described below.

The computing system $MPC_2$ can identify the eligible user group-based vectors using the first stage lookup key of the digital component request. The computing system $MPC_2$ can access the first stage LUT and use the first stage lookup key to identify the rows of the second stage LUT that include information for a digital component that is eligible to presented, e.g., for which a selection value has been received, for the set of contextual signals represented by the first stage lookup key. As described above, each computing system $MPC_1$ and $MPC_2$ can maintain a respective two stage LUT that includes the same information.

For each eligible selection value, the computing systems $MPC_1$ and $MPC_2$ determine whether the selection value and its digital component is a candidate for being selected for distribution to the client device 110 in response to the digital component requests (408). The candidate user group-based vectors are the eligible user group-based vectors for digital components that have a user group identifier that matches a user group identifier for the user, e.g., a user group identifier for a user group that includes the user as a member. As described above, each digital component can be mapped to one or more user groups that includes members to which the DSP 150 or digital component provider 160 indicated that the digital component should be presented. This information is part of the second stage lookup key for the second stage LUT, as described above.

A digital component of a row in the second stage LUT is a candidate for selection if its user group identifier ug_id that is part of the second stage lookup key for the row matches one of the user group identifiers of the user. Conceptually, to determine whether a digital component is a candidate using a cuckoo filter to represent a user's group membership, where the cuckoo filter allows a element to be inserted into one of two (or more) possible locations, a computing system can determine whether the user group identifier ug_id of the second stage lookup key matches one of the two (or more) tags in one of the two (or more) cuckoo filter locations.

In addition to this user group-based condition, the MPC cluster 130 can apply other conditions, frequency control, muting, budget, k-anonymity, and/or pacing constraints. For example, to be a candidate for a digital component selection process, a digital component can be required to satisfy one or more conditions for eligibility in the digital component selection process. These conditions can include, for example, whether the user group associated with the digital component matches a user group of the user to which the digital component will be provided; whether the digital component satisfies a frequency control condition that prevents the same user from being exposed to the same digital component more than a specified number of times within a period of time; whether the digital component satisfies a muted condition that prevents the digital component from being presented to a user that has selected to mute; whether the digital components satisfies a k-anonymity condition; and/or whether a campaign that includes the digital component satisfies a pacing eligibility condition that paces the distribution of digital components in the campaign.

The computing systems $MPC_1$ and $MPC_2$ can identify the candidate user group-based vectors using secure MPC techniques using secret shares such that neither computing system $MPC_1$ nor $MPC_2$ knows which digital components are candidates or the user groups that include the user as a member. To do this, computing system $MPC_1$ calculates a first share of a candidate parameter is_dc_a_candidate for each cached digital component associated with user group identifier ug_id. Similarly, computing system $MPC_2$ calculates a second share of the candidate parameter is_dc_a_candidate for each cached digital component associated with user group identifier ug_id. The candidate parameter is_dc_a_candidate can be a Boolean value (e.g., zero or one) that indicates whether cached user group-based vectors linked to the cached digital components are candidates. If a user group-based vector for a digital component is a candidate, then its corresponding selection value calculated using the user group-based vector is a candidate as well as the corresponding digital component.

The first share of the candidate parameter is_dc_a_candidate can be represented as [is_dc_a_candidate$_{dc,1}$] and the second share of the candidate parameter is_dc_a_candidate can be represented as [is_dc_a_candidate$_{dc,2}$]. The first secret share of the candidate parameter for a cached digital component dc associated with user group identifier ug_id is a secret share of a Boolean ug_id==[$m_{F_1(ug\_id),1}$], which is equivalent to ug_id==[$g_{ug\_id,1}(F_1(ug\_id))$]. The second secret share of the candidate parameter for a cached digital component dc associated with user group identifier ug_id is a secret share of a Boolean ug_id==[$m_{F_1(ug\_id),2}$], which is equivalent to ug_id==[$g_{ug\_id,2}(F_1(ug\_id))$]. The symbol "==" represents an equality test, which is true (or 1) if the two values are equal or false (or 0) if the values are not equal.

The computing systems $MPC_1$ and $MPC_2$ can compute the secret shares [is_dc_a_candidate$_{dc,1}$] and [is_dc_a_candidated$_{c,2}$] for the hash function $F_1$ using secure MPC techniques with one or more roundtrips between the computing systems $MPC_1$ and $MPC_2$ to evaluate the equality expressions of ug_id==[$g_{ug\_id,1}(F_1(ug\_id))$] and ug_id==[$g_{ug\_id,2}(F_1(ug\_id))$]. That is, the computing systems $MPC_1$ and $MPC_2$ can determine the secret shares [is_dc_a_candidate$_{dc,1}$] and [is_dc_a_candidated$_{c,2}$] for each cached digital component dc associated with user group identifier ug_id based on the distributed point functions $g_{ug\_id,1}$ and $g_{ug\_id,2}$ for each user group identifier received from the client device 110 as part of the digital component request.

The computing systems $MPC_1$ and $MPC_2$ can use secret sharing techniques or secret sharing libraries that support the operations shown in Table 3 below. One example secret sharing technique that supports these operations is Security through Private Information Aggregation (SEPIA).

TABLE 3

| Syntax of Operation | Output | Remark |
|---|---|---|
| [a] + [b] | [a + b] | Add two shares for two secrets, respectively. |
| Reconstruct([a$_1$], [a$_2$]) | a | Reconstruct a secret a from its shares a$_1$ and a$_2$. The result is a in plaintext. |
| c × [a] | [c × a] | Multiply a share with a known constant in plaintext. |
| [a] × [b] | [a × b] | Multiply two shares of two secrets, respectively. |
| [a] == b | [1] if a == b, [0] otherwise | Test the equality between a secret a represented as a secret share and a constant plaintext value b. This can require multiple roundtrips between MPC servers. |

The computing system $MPC_1$ determines an order of the selection values calculated based on the user group-based vectors and the contextual vectors (410). Similarly, the computing system $MPC_2$ determines an order of the selection values based on the user group-based vectors and the contextual vectors (412). Each computing system $MPC_1$ and $MPC_2$ can determine an order of the selection values associated with cached digital components in its second stage LUT that match the UG_Request_Key. This order can include all of the selection values calculated for all digital components cached in the second stage LUT that match UG_Request_Key, including the selection values for candidate digital components that are eligible for the digital component selection process and the selection values for digital components that are not candidates and therefore are not eligible. The order can be from the highest selection value calculated to the lowest selection value calculated. In some implementations, the selection values used for the order can be the value that would be provided to the publisher of the resource with which a selected digital component would be presented, e.g., after any sharing with a DSP 150 and/or SSP 170. As the selection values are in cleartext, the computing systems $MPC_1$ and $MPC_2$ do not have to perform any roundtrip computations to order the selection values. Instead, each computing system $MPC_1$ and $MPC_2$ can order the selection values of its second stage LUT independently. If the selection values were stored as secret shares at each computing system $MPC_1$ and $MPC_2$, with each computing system $MPC_1$ and $MPC_2$ having a respective secret share of each selection value, the computing systems $MPC_1$ and $MPC_2$ can perform a secure MPC process using roundtrip computations to order the selection values.

The computing systems $MPC_1$ and $MPC_2$ determine secret shares of an accumulated value for each candidate selection value associated with a cached digital component (414). Conceptually, the accumulated value for a given selection value for a digital component represents a total number of candidate selection values from the top of the order to the given selection value, including the given selection value if the given selection value is a candidate. This concept is shown in Table 4 below.

TABLE 4

| Ordered Selection Values | is_dc_a_candidate | Accumulated Value (acc) | Is Accumulated Value Equal to 1? |
|---|---|---|---|
| Highest | 0 | 0 | 0 |
| $2^{nd}$ Highest | 1 | 1 | 1 |
| $3^{rd}$ Highest | 0 | 1 | 1 |
| $4^{th}$ Highest | 1 | 2 | 0 |
| . . . | . . . | . . . | . . . |

In some implementations, the accumulated value for a given selection value for a digital component represents a total number of candidate selection values from the top of the order to the given selection value, excluding the given selection value if the given selection value is a candidate. In this example, the fourth column would represent whether the accumulated value is equal to zero rather than one. In either case, the accumulated value for each selection value indicates a position of the selection value in a ranked order of the candidate selection values that are candidates for selection based on the selection value being associated with a user group identifier that matches a user group identifier of the user.

In Table 4, the accumulated value (acc) is incremented for each selection value that has a candidate parameter is_dc_a_candidate equal to one as it progresses from the top of the order to the bottom of the order. For example, the accumulated value acc for the highest selection value associated with a cached digital component is zero as the candidate parameter is_dc_a_candidate for the digital component having the highest selection value is equal to zero. The accumulated value acc for the digital component having the second highest selection value is one as the candidate parameter is_dc_a_candidate for the digital component having the second selection value is equal to one and none of the digital components above the digital component having the second highest selection value has a candidate parameter is_dc_a_candidate equal to one. Moving down the order, the candidate parameter is_dc_a_candidate for the digital component having the third highest selection value is zero, so the accumulated value acc for the digital component having the third highest selection value is not incremented from the accumulated value acc for the digital component having the second highest selection value. As the candidate parameter is_dc_a_candidate for the digital component having the fourth highest selection value is one, the accumulated value acc for the digital component having the fourth highest selection value is incremented by one from the accumulated value acc for the digital component having the third highest selection value. Thus, the accumulated value acc for the digital component having the fourth highest selection value is equal to two as there are two selection values that have a candidate parameter is_dc_a_candidate from the highest selection value to the fourth highest selection value, inclusive.

In some implementations, the accumulated value for a given digital component represents a total number of candidate digital components from the top of the order to the given digital component, excluding the given digital component. In this example, the fourth column would represent whether the accumulated value is equal to zero rather than one. In either case, the accumulated value for each digital component indicates a position of the digital component in a ranked order of the candidate digital components that are candidates for selection based on the digital component being associated with a user group identifier that matches a user group identifier of the user.

Using Table 4, the computing systems $MPC_1$ and $MPC_2$ would select, for distribution to the client device 110, the digital component corresponding to the selection parameter for which the candidate parameter is_dc_a_candidate has a value of one and the accumulated value acc has a value of one, as indicated in the fourth column of Table 4. This represents the digital component having the highest ordered selection value for which the candidate parameter is_dc_a_candidate has a value of one. As the candidate parameter is_dc_a_candidate is in secret shares for the computing systems $MPC_1$ and $MPC_2$ to maintain user privacy and ensure that user data is not leaked, the computing systems $MPC_1$ and $MPC_2$ determine secret shares of the accumulated value acc for each selection value and use roundtrip computations to determine which selection value has an accumulated value acc that is equal to one and a candidate parameter is_dc_a_candidate that is equal to one.

The computing systems $MPC_1$ and $MPC_2$ can determine their secret shares of the accumulated value acc for each digital component independently without any roundtrip computations. For example, computing system $MPC_1$ can determine, for each digital component dc, a first share $[acc_{dc,1}]$ of the accumulated value acc by traversing all of the selection values in order from highest to lowest and summing the candidate parameters is_dc_a_candidate for the digital components in the order along the way, as described above with reference to Table 4. Similarly, computing system $MPC_2$ can determine, for each digital component dc, a second share $[acc_{dc,2}]$ of the accumulated value acc by traversing all of the selection values in order from highest to lowest and summing the candidate parameters is_dc_a_candidate for the digital components in the order along the way.

The computing systems $MPC_1$ and $MPC_2$ determine, for each selection value associated with a digital component dc, secret shares of a result that indicates whether the accumulated value acc has a specified value (416). The specified value can be a value of one, as shown in columns 3 and 4 of Table 4, or zero in other implementations. As described above, the digital component for which the accumulated value is one and the candidate parameter is_dc_a_candidate is one is the digital component having the highest selection value among the candidate selection values.

The computing systems $MPC_1$ and $MPC_2$ can engage in multiple rounds of computations, e.g., multiple remote procedure calls (RPCs), as part of a secure MPC process to calculate the equality operation $acc_{dc}==1$ in terms of secret shares for each digital component. At the end of this process, computing system $MPC_1$ has, for each digital component dc, one secret share of the result $[acc_{dc,1}]==1$, and computing system $MPC_2$ has, for each digital component dc, the other secret share of the result $[acc_{dc,2}]==1$.

The computing systems $MPC_1$ and $MPC_2$ determine a selection result (418). The computing systems $MPC_1$ and $MPC_2$ can determine the selection result based on, for each digital component dc, the secret shares of the $acc_{dc}==1$ and the secret shares of the candidate parameter is_dc_a_candidate$_{dc}$. To do so, the computing systems MPC$_1$ and MPC$_2$ can calculate a winner parameter is_dc_the_winner$_{dc}$ for each digital component dc in terms of secret shares. The winner parameter is_dc_the_winner$_{dc}$ can be a Boolean value (e.g., zero or one, or true or false) that indicates whether the digital component dc is the winner of the selection process, e.g., whether the digital component corresponding is selected for distribution to the client device 110 in response to the digital component request.

The winner parameter is_dc_the_winner$_{dc}$ for a digital component can be based on the candidate parameter is_dc_a_candidate$_{dc}$ for the digital component and whether the accumulated value acc for the digital component is equal to the specified value, e.g., equal to one or zero depending on how the fourth column of Table 4 is determined as described above. In the example that follows, the MPC cluster 130 can determine, for each digital component, a product of these two parameters. Other techniques can also be used to determine whether both the candidate parameter is_dc_a_candidate$_{dc}$ is true or one and the accumulated value is equal to the specified value, e.g., using truth tables as described below.

Each computing system MPC$_1$ and MPC$_2$ can carry out secret share multiplication protocol to calculate, for each digital component dc, the winner parameter is_dc_the_winner$_{dc}$=(is_dc_a_candidate$_{dc}$×(acc$_{dc}$==1)) in terms of secret shares. Depending on the secure MPC process used, this can require one RPC between the computing systems MPC$_1$ and MPC$_2$ to multiple two secret shares. At the end of this MPC process, computing system MPC$_1$ has, for each digital component dc, one secret share of the result is_dc_the_winner$_{dc}$ represented as [is_dc_the_winner$_{dc,1}$]=[is_dc_a_candidate$_{dc,1}$]×([acc$_{dc,1}$]==1). Similarly, computing system MPC$_2$ has, for each digital component dc the other secret share of the result is_dc_the_winner$_{dc}$ represented as [is_dc_the_winner$_{dc,2}$]=[is_dc_a_candidate$_{dc,2}$]×([acc$_{dc,2}$]==1). Note that for all digital components, at most one digital component has a winner parameter is_dc_the_winner$_{dc}$ that is equal to one, which corresponds to the digital component that is selected for distribution to the client device 110. All others would equal zero.

The computing systems MPC$_1$ and MPC$_2$ can calculate the selection result based on the winner parameters for the digital components and the digital component information element dc_information_element for the digital components. As described above, the digital component information element dc_information_element for a digital component can include the selection value for the digital component and other data for the digital component, e.g., in the form of a byte array having a sequence of numbers.

The computing systems MPC$_1$ and MPC$_2$ can calculate the selection result which is resultF$_1$ using relationship 5 below.

$$\text{resultF}_1 = \Sigma_{dc} \text{is\_dc\_the\_winner}_{dc} \times \text{dc\_information\_element}_{dc} \quad (5)$$

In this example, the selection result resultF$_1$ will either have a value zero if there are no cached digital components that have a user group identifier that matches a user group identifier of the user or will have a value equal to the digital component information element dc_information_element of the selected digital component that has a winner parameter is_dc_the_winner$_{dc}$ that is equal to one.

To perform the calculation in secret shares, computing system MPC$_1$ takes all of the cached digital component information elements and, for each digital component dc, multiplies the digital component information element dc_information_element$_{dc}$, which can be in cleartext, by the first secret share of the winner parameter [is_dc_the_winner$_{dc,1}$]. The computing system MPC$_1$ can then determine the sum of these products and return the sum to the client device 110 that submitted the digital component request. That is, computing system MPC$_1$ can determine, as a first share of the result [resultF$_1$], the sum using relationship 6 below.

$$[\text{resultF}_{1,1}] = \Sigma_{dc}([\text{is\_dc\_the\_winner}_{dc,1}] \times \text{dc\_information\_element}_{dc}) \quad (6)$$

The computing system MPC$_2$ can perform a similar calculation to determine the second share of the result [resultF$_{1,2}$] using relationship 7 below.

$$[\text{resultF}_{1,2}] = \Sigma_{dc}([\text{is\_dc\_the\_winner}_{dc,2}] \times \text{dc\_information\_element}_{dc}) \quad (7)$$

The computing system MPC$_1$ can return the first share of the selection result [resultF$_{1,1}$] to the client device 110. Similarly, the computing system MPC$_2$ can return the second share of the selection result [resultF$_{1,2}$] to the client device 110. The application 112 can then reconstruct the selection result resultF$_1$ in cleartext using the two secret shares [resultF$_{1,1}$] and [resultF$_{1,2}$], e.g., by determining a sum of the secret shares if additive secret share algorithms are adopted. If the selection result resultF$_1$ has a value of zero, then the MPC cluster 130 did not identify a digital component for any user group that includes the user as a member. Otherwise the selection result resultF$_1$ has a value equal to a digital component information element dc_information_element, the application 112 can parse the digital component information element dc_information_element to obtain the selection value and the metadata for the digital component. The application 112 can then either display the digital component or perform a selection process using the digital component and other digital components received from an SSP 170, as described above.

In a two-table cuckoo filter implementation, the application 112 can receive two selection results, one for each hash function F$_1$ and F$_2$. In this example, the application 112 can select a digital component from a set of digital components that includes both of these digital components and any digital components received from the SSP 170.

In some implementations, the application 112 can perform a final verification that the user group for the digital component(s) selected by the MPC cluster 130 matches a user group that includes the user as a member. For example, the digital component information element dc_information_element for each digital component can include the user group identifier(s) for the digital component. The application 112 can compare the user group identifier(s) of the digital component information element dc_information_element to the user group list for the user. If there is no match, the application 112 can exclude the digital component from the selection process. If there is a match, the application 112 can include the digital component in the selection process.

As described above, receiving two selection results from the MPC cluster 130 can facilitate selection value scrapping. To reduce this risk, the MPC cluster 130 can perform a process to return only one selection result.

In a one-table cuckoo filter implementation, each user group identifier ug_id can show up in two (or more) places whose indices are F$_1$(ug_id) and F$_2$(ug_id). Let M represent the one-table cuckoo filter and M$_i$ represent the value of the i-th element in the table. The candidate parameter is_dc_a_candidate$_{dc}$ for a selection value for a digital component with the user group identifier ug_id is true if either $M_{F_1(ug\_id)}$==ug_id or $M_{F_2(ug\_id)}$==ug_id. This MPC cluster 130 can calculate candidate parameter is_dc_a_candidate$_{dc}$ for the digital component dc associated with user group identifier ug_id for the selection value using either relationship 8 or 9 below.

$$\text{is\_dc\_a\_candidate}_{dC} = (M_{F_1(ug\_id)} == \text{ug\_id}) + (M_{F_2(ug\_id)} == \text{ug\_id}) \quad (8)$$

$$\text{is\_dc\_a\_candidate}_{dC} = ((M_{F_1(ug\_id)} - \text{ug\_id}) \times (M_{F_2(ug\_id)} - \text{ug\_id})) == 0 \quad (9)$$

Relationship 8 can involve two equality tests that can be performed in parallel. Relationship 9 can involve one equality test and one multiplication. When performing these operations over secret shares using a secure MPC process, multiplication requires less computation and one round trip but an equality test can require more computation and four roundtrips in a probabilistic solution. Thus, relationship 8 can require one less round trip but more computation than relationship 9.

The computing system MPC$_1$ can calculate, based on relationship 8, the candidate parameter is_dc_a_candidate& for a digital component dc associated with user group identifier ug_id for the selection value over secret shares using relationship 10 below.

$$[\text{is\_dc\_a\_candidate}_{dc,1}] = (\text{ug\_id} == [g_{ug\_id,1}(F_1(\text{ug\_id}))]) + (\text{ug\_id} == [g_{ug\_id,1}(F_2(\text{ug\_id}))]) \quad (10)$$

Similarly, computing system MPC$_2$ can calculate, based on relationship 9, the candidate parameter is_dc_a_candidate$_{dc}$ for the digital component dc associated with user group identifier ug_idover secret shares using relationship 11 below.

$$[\text{is\_dc\_a\_candidate}_{dc,2}] = (\text{ug\_id} == [g_{ug\_id,2}(F_1(\text{ug\_id}))]) + (\text{ug\_id} == [g_{ug\_id,2}(F_2(\text{ug\_id}))]) \quad (11)$$

The computing system MPC$_1$ can calculate, based on relationship 9, the candidate parameter is_dc_a_candidate$_{dc}$ for the digital component dc associated with user group identifier ug_id over secret shares using relationship 12 below.

$$[\text{is\_dc\_a\_candidate}_{dc,1}] = (\text{ug\_id} - [g_{ug\_id,1}(F_1(\text{ug\_id}))]) \times (\text{ug\_id} - [g_{ug\_id,1}(F_2(\text{ug\_id}))]) \quad (12)$$

The computing system MPC$_2$ can calculate, based on relationship 10, the candidate parameter is_dc_a_candidate$_{dc}$ for the digital component dc associated with user group identifier ug_id over secret shares using relationship 13 below.

$$[\text{is\_dc\_a\_candidate}_{dc,2}] = (\text{ug\_id} - [g_{ug\_id,2}(F_1(\text{ug\_id}))]) \times (\text{ug\_id} - [g_{ug\_id,2}(F_2(\text{ug\_id}))]) \quad (13)$$

The MPC cluster 130 can then use a similar process as the process 300 of FIG. 3 to calculate secret shares of the selection result. In particular, the computing systems MPC$_1$ and MPC$_2$ can calculate, for each digital component dc, the secret shares [acc$_{dc,1}$] and [acc$_{dc,2}$] of the accumulated value acc, respectively, based on the order of the selection values for the digital components and the candidate parameters for the digital components.

The computing systems MPC$_1$ and MPC$_2$ can calculate, for each digital component dc, the secret shares [is_dc_the_winner$_{dc,1}$] and [is_dc_the_winner$_{dc,2}$] of the winner parameter is_dc_the_winner, respectively, based on the candidate parameter for the digital component dc and whether the accumulated value for the digital component dc equals one.

The computing systems MPC$_1$ and MPC$_2$ can calculate secret shares [result$_1$] and [result$_2$] of the selection result, using relationships 14 and 15 below.

$$[\text{result}_1] = \Sigma_{dc}([\text{is\_dc\_the\_winner}_{dc,1}] \times \text{dc\_information\_element}_{dc}) \quad (14)$$

$$[\text{result}_2] = \Sigma_{dc}([\text{is\_dc\_the\_winner}_{dc,2}] \times \text{dc\_information\_element}_{dc}) \quad (15)$$

The computing system MPC$_1$ can return the first share of the selection result [result] to the application 112 and computing system MPC$_2$ can return the second share of the selection result [result$_2$] to the application 112. The application 112 can then reconstruct the selection result using the two secret shares, as described above.

In some implementations, rather than use distributed point functions, the cuckoo filter itself can be sent to the MPC cluster 130. In this example, the application 112 can use a pseudo random function (PRF) parameterized by either a user group identifier or an identifier from the set of blocked identifiers and either of two random variables generated by the application 112. For example, assume that the three random variables generated by the application 112 are rand_var1a, rand_var1b and rand_var2. Also assume that each item in a bucket is a k-bit integer. In some implementations, the application 112 and the MPC cluster 130 agree on a PRF in advance, where k is the number of bits in each item in a bucket of the cuckoo filter. Each item in a bucket of the cuckoo filter can be occupied by a user group identifier or a blocked identifier, or empty. For example, the application 112 can generate a cuckoo filter table whose items are PRF(ug_id, rand_var1a), PRF(blocked_id, rand_var1b), or 0, where ug_id is the identifier of the user group generated by applying HMAC on the label (e.g., user group identifier) of the user group based on the domain of the content provider and 0 represents an empty item. The process is repeated on all user group identifiers and blocked identifiers.

The application 112 can generate a vector B based on a cuckoo filter table generated for the user group identifiers and blocked identifiers. Each value B$_i$ in the vector B can be represented as B$_i$=(A$_i$_PRF(rand_var2, i)) mod p where A is the cuckoo filter table and i is the index of the vector B and cuckoo filter table A. When the application 112 initiates a request for a digital component for a digital component slot, the application transmits rand_var1a, rand_var1b and rand_var2 as parameters of the request to computing system MPC$_1$. The application 112 also transmits the vector B, rand_var1a and rand_var1b as parameters of the request to computing system MPC$_2$. PRF(rand_var2, i) and B$_i$ are two additive secret shares of A$_i$ in Z$_p$, held by computing systems MPC$_1$ and MPC$_2$ respectively. Because neither of the computing systems MPC$_1$ and MPC$_2$ have access to both the secret shares, neither of the computing systems can recreate the cuckoo filter table, preserving user privacy.

The computing system MPC$_1$ determines whether each candidate selection value is associated with a user group specified in the request. The computing system MPC$_1$ receives the equivalent of an array of secret shares for the cuckoo filter table M, denoted by [M$_1$]. Each user group identifier present in M will be in one of N possible locations.

The computing system MPC$_1$ calculates the user group-based candidate parameter [is_dc_a_candidate$_{x,1}$] according to relationship 16 below:

$$0 == \Pi_{i=1}^{N}([M_{F_i(ug\_id(x)),1}] - \text{PRF}(\text{ug\_id}(x), \text{rand\_val1a}))$$
$$\text{AND } 0 \neq \Pi_{i=1}^{N}([M_{F_i(block\_id(x)),1}] - \text{PRF}(\text{block\_id}(x), \text{rand\_val1b}) \quad (16)$$

where Π denotes the multiplication of multiple items. Here, ug_id(x) is a function used to retrieve the user group identifier ug_id associated with a selection value x, {$F_1, \ldots F_N$} is a set of hash functions to calculate possible index of an item within the cuckoo filter table A, and rand_val1a is the random value received in the digital component request. [$M_{x,1}$] is the x-th element in the array [$M_1$]. == is the equality test between a cleartext integer and a secret share of a secret integer. The result of == is a secret share of a secret integer that is either 0 (not equal) or 1 (equal). Here, the value of [$M_{i,1}$]=[PRF(rand_val2a, i)$_1$].

Similarly, computing system MPC$_2$ calculates user group-based candidate parameter [is_dc_a_candidate$_{x,2}$] according to relationship 17 below:

$$0 == \Pi_{i=1}^{N}([M_{F_i(ug\_id(x)),2}] - \text{PRF}(ug\_id(x), \text{rand\_val1a}))$$
$$\text{AND } 0 \neq \Pi_{i=1}^{N}([M_{F_i(block\_id(x)),2}] - \text{PRF}(block\_id(x), \text{rand\_val1b})) \quad (17)$$

Here, the value of [$M_{i,2}$]=$B_i$.

The above description relates to multiplication between secret shares of secret integers whose value is either 0 or 1 to computer logical AND. The above description also relates to 1 minus a secret share of a secret integer whose value is either 0 or 1 to computer logical NOT. In some implementations, alternative solutions can be adopted to evaluate logical expressions with secret shares. For example, to compute the logical AND of additive several secret shares of secret integers whose value are either 0 or 1, the MPC server can compare the sum of those additive secret shares to the number of secret shares. For yet another example, to compute an arbitrary logical expression with secret shares as input, the MPC server can adopt the truth table approach, i.e., computing system MPC$_1$ can build a truth table that contains one row for each possible combination of input secret shares held by MPC$_2$. The computing system MPC$_1$ randomly chooses a secret share for the result, denoted as [result$_1$]. For each row, computing system MPC$_1$ can combine its input secret shares and the speculative input secret shares held by MPC$_2$ to reconstruct the input to the logical expression in cleartext, then evaluate the result of the logical expression. For each row, computing system MPC$_1$ splits the result to two secret shares, one of which is [result$_1$], the other is [result$_2$]. The computing system MPC$_1$ then writes [result$_2$] to the row in the truth table. After computing system MPC$_1$ completes the construction of the truth table, computing system MPC$_2$ can initiate an Oblivious Transfer extension (OTe) to fetch the row in the truth table corresponding to the input secret shares held by MPC$_2$. The fetch result is [result$_2$]. At the end of the above process, computing systems MPC$_1$ and MPC$_2$ hold [result$_1$] and [result$_2$] respectively, which are the secret shares of the logical expression result. The computing system MPC$_1$ has no knowledge of the value of [result$_2$], and computing system MPC$_2$ has no knowledge of the value of [result$_1$]. In some implementations, computing systems MPC$_1$ and MPC$_2$ can evaluate the logical expression to determine is_dc_a_candidate$_{sv,1}$ and is_dc_a_candidate$_{sv,2}$ by constructing a garbled circuit.

Figure 5:
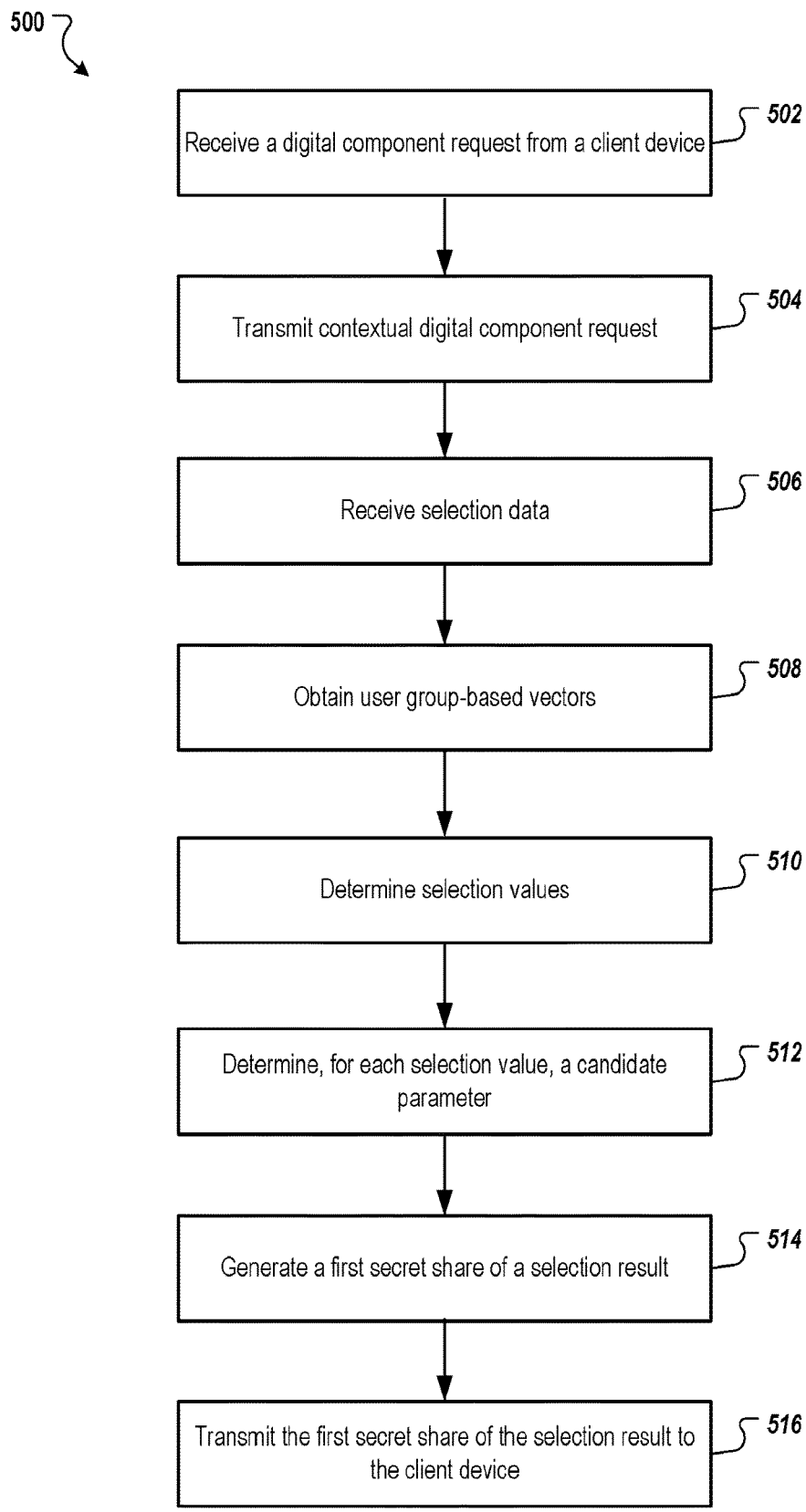
FIG. 5 is a flow diagram that illustrates an example process for selecting a digital component for distribution to a client device.

FIG. 5 is a flow diagram that illustrates an example process 500 for selecting a digital component for distribution to a client device. Operations of the process 500 can be implemented, for example, by the computing system MPC$_1$ or the computing system MPC$_2$ of the MPC cluster 130. Operations of the process 500 can also be implemented as instructions stored on one or more computer readable media which may be non-transitory, and execution of the instructions by one or more data processing apparatus can cause the one or more data processing apparatus to perform the operations of the process 500. For brevity, the process 500 is described as being performed by computing system MPC$_1$.

The computing system MPC$_1$ receives, from a client device 110, a digital component request (502). The digital component request can include secret shares of data identifying one or more first user groups that include a user of the client device 110 as a member. For example, the digital component request can include one or more Cuckoo filters or other suitable probabilistic data structures, and/or distributed point functions. Each distributed point function can represent a secret share of a point function that indicates whether a user of the client device is a member of a respective first user group identified by a respective first user group identifier. For example, the digital component request received by computing system MPC$_1$ can include a distributed point function $g_{ug\_id,1}$ for each user group that includes the user of the client device 110 as a member. The digital component request can also include contextual signals, a first-party cookie, and/or a cohort identifier, as described above.

The digital component request can also include a lookup key. For example, the digital component request can include a UG_Request_Key, which can be a composite message that is based on a set of contextual signals, e.g., a set of contextual signals of the digital component request. A similar digital component request can be sent to one or more additional MPC systems, e.g., computing system MPC$_2$, that will collaborate with computing system MPC$_1$ in a secure MPC process to select a digital component to provide to the client device 110 in response to the digital component request. Each other digital component request can include, for each distributed point function of the digital component request, a corresponding distributed point function generated for the same user group identifier using the same point function. For example, computing system MPC$_2$ would receive a corresponding distributed point function $g_{ug\_id,2}$ for each distributed point function $g_{ug\_id,1}$ received by computing system MPC$_1$.

The computing system MPC$_1$ transmits a contextual digital component request to a content platform (504). For example, the computing system MPC$_1$ can transmit a contextual digital component request to an SSP 170. The contextual digital component request can include contextual signals, the first-party cookie, and the cohort identifier of the received digital component request.

The computing system MPC$_1$ receives selection data for each of multiple digital components (506). The selection data for a digital component can include first vector data defining a contextual-based vector $V_{context}$ of values selected based at least in part on the set of contextual signals. For example, the selection data for the digital component can include the contextual-based vector or an array of first secret shares of the values of the contextual-based vector.

The computing system MPC$_1$ obtains; for each of the multiple digital components, second vector data defining a user group-based vector $V_{ug}$ of values selected based at least in part on a respective user group corresponding to the digital component (508). For example, computing system MPC$_1$ can store the user group-based vector $V_{ug}$ of first secret shares of the user group-based vector $V_{ug}$.

The computing system MPC$_1$ determines a selection value for each digital component based on the first vector data and the second vector data (510). For example, the computing system MPC$_1$ can determine a dot product of the two vectors $V_{ug}$ and $V_{context}$. If the vectors are transmitted and stored in secret shares, the computing system MPC$_1$ can collaborate with computing system $MPC_2$ to determine secret shares of the dot product of the vectors $V_{ug}$ and $V_{context}$. In some implementations, computing system $MPC_1$ determines the selection value for a digital component using the vectors $V_{ug}$, $V_{context}$, and a user profile vector for a user profile of the user, as described above.

The computing system $MPC_1$ determines, for each digital component using a secure MPC process in collaboration with one or more second computing systems of the plurality of MPC systems, a candidate parameter (512). The candidate parameter is_dc_a_candidate can indicate whether the digital component satisfies one or more conditions for eligibility in the digital component selection process. These conditions can include, for example, whether the user group associated with the digital component matches a user group of the user to which the digital component will be provided; whether the digital component satisfies a frequency control condition that prevents the same user from being exposed to the same digital component more than a specified number of times within a period of time; whether the digital component satisfies a muted condition that prevents the digital component from being presented to a user that has selected to mute; whether the digital components satisfies a k-anonymity condition; and/or whether a campaign that includes the digital component satisfies a pacing eligibility condition that paces the distribution of digital components in the campaign.

For example, candidate parameter is_dc_a_candidate can indicate whether the second user group identifier corresponding to the digital component matches at least one of the one or more first user group identifiers. That is, in this example the candidate parameter is_dc_a_candidate for a digital component indicates whether the user group identifier for the digital component matches a user group identifier for a user group that includes the user of the client device 110 as a member. If so, the digital component is a candidate digital component that is a candidate for being selected. As described above, computing system $MPC_1$ can collaborate with the one or more additional MPC systems, including computing system $MPC_2$, using a secure MPC process to obtain a first secret share of the candidate parameter is_dc_a_candidate for each selection value.

This determination of the candidate parameter the digital components can be performed after filtering the digital components based on context, e.g. using the user group request key UG_Request_Key. For example, the MPC cluster 130 can perform two sequential stage filtering operations, one based on the request key and another based on the one or more conditions using the candidate parameter is_dc_a_candidate.

The computing system $MPC_1$ generates a first secret share of a selection result (514). The computing system $MPC_1$ can collaborate with the one or more additional MPC systems, including computing system $MPC_2$, to generate the selection result. In general, the selection result identifies the candidate digital component having the highest selection value. As described above, the MPC systems can sort the selection values, determine an accumulated value for each selection value, and determine secret shares of a winner parameter is_dc_the_winner for each digital component associated with a selection value. The MPC systems can then collaborate to determine, as secret shares of the selection result, secret shares of a sum of, for each selection value, a product of the winner parameter for the selection value and a digital component information element for the selection value. For example, the MPC systems can determine the secret share of the sum of products using relationship 5 shown above.

The computing system $MPC_1$ provides, to the client device 110, the first secret share of the selection result identifying the given digital component (516). As described above, the selection result identifies the selected digital component and the selection value for the digital component. The client device 110 can also receive a respective secret share of the selection result from each of the one or more additional MPC systems. The client device 110 can reconstruct the selection result using the secret shares, as described above.

In some cases, the contextual vectors $V_{context}$ can be considered sensitive information for DSPs. In such cases, the DSPs can provide encrypted versions of the contextual vectors $V_{context}$, e.g., in secret shares. For example, the DSP 150 can provide a first secret share of the contextual vector $V_{context}$ to computing system $MPC_1$ and a second secret share of the contextual vector $V_{context}$ to $MPC_2$. In this example, the computing systems $MPC_1$ and $MPC_2$ can determine the digital component having the highest selection value, and therefore is the selected digital component using a secure MPC process such that the computing systems cannot access the vectors or selection values in cleartext. This can be used in place of the sorting based on accumulated values described above.

The computing systems $MPC_1$ and $MPC_2$ can then perform a secure MPC process to calculate the dot product of the vectors (e.g., the user group vector, the contextual vector, and the user vector). The result of this computation is, two arrays of secret shares $[V_1]=\{[v_{1,1}], \ldots [v_{N,1}]\}$ and $[V_2]=\{[v_{1,2}], \ldots [V_{N,2}]\}$. In these representations, N is the dimension of the array and the second subscript represents the secret share of the element, e.g., first=1, second=2.

Each element in the array can correspond to a selection value for a digital component. For example, $[v_{1,1}]$ and $[v_{1,2}]$ can be two secret shares of an element for a selection value for a digital component. In some implementations, each element in the array includes a composite message (e.g., a byte array) for a digital component. The byte array can include the selection value resulting from the dot product computation and information for the digital component, as described above.

Assume that both computing systems $MPC_1$ and $MPC_2$ have access to the same list of cleartext items $\{Item_1, \ldots Item_N\}$ corresponding to the elements arrays. A function reconstruct can be used to reconstruct the value $v_i$ of an item in the array represented by the secret shares $[v_{i,1}]$ and $[v_{i,2}]$. That is, $v_i$=reconstruct $([v_{i,1}], [v_{i,2}])$.

The computing systems $MPC_1$ and $MPC_2$ can return a maximum value and the corresponding item in the array having the maximum value without leaking any information to either computing system $MPC_1$ or $MPC_2$ in cleartext. To do so, computing system $MPC_1$ should return a pair of secret shares $\{[max\_v_1], [max\_element_1]\}$ and computing system $MPC_2$ should return a pair of secret shares $\{[max\_v_2], [max\_element_2]\}$ such that reconstruct$([max\_v_1], [max\_v_2])$=reconstruct$([v_{max\_i,1}], [V_{max\_i,1}])$ and reconstruct $([max\_element_1], [max\_element_2])=Item_{max\_i}$. In this example, maximum value corresponds to the highest selection value and the maximum element corresponds to the digital component having the maximum value. The maximum element can include the composite message, e.g., byte array for the digital component.

One way to determine the maximum value and the element having the maximum value in secret shares is to pairwise secret share comparison between any pairs of secret shares. For example, for any $1 \leq i \leq j \leq N$, computing systems $MPC_1$ and $MPC_2$ can collaborate to perform a secret share comparison. The computing system $MPC_1$ obtains $[m_{i,j,1}]=[v_{i,1}]>[v_{j,1}]$ and computing system $MPC_2$ obtains $[m_{i,j,2}]=[v_{i,2}]>[v_{j,2}]$. The comparison parameter $m_{i,j}$=reconstruct ($[m_{i,j,1}]$, $[m_{i,j,2}]$) is one if $v_i>v_j$ and zero otherwise. The secret shares $[m_{i,j,1}]$ and $[m_{i,j,2}]$ of the parameter $m_{i,j}$ can be additive secret shares in $Z_M$ where M≥N.

To find the maximum element, computing system $MPC_1$ counts locally how many other values are larger than $v_i$ for each i∈[1,N], i.e., $[count_{i,1}]=\Sigma_{j=1}^{i-1}[m_{j,i,1}]+\Sigma_{j=i+1}^{i-1}(1-[m_{i,j,1}])$. Similarly, computing system $MPC_2$ counts locally how many other values are larger than $v_i$ for each i∈[1, N], i.e., $[count_{i,2}]=\Sigma_{j=1}^{i-1}[m_{j,i,2}]+\Sigma_{j=i+1}^{i-1}(1-[m_{i,j,2}])$. The computing systems $MPC_1$ and $MPC_2$ then collaborate to test whether $count_i$ is equal to zero for each i∈[1, N], i.e., computing system $MPC_1$ has $[is\_max\_element_{i,1}]=([count_{i,1}]==0)$ and computing system $MPC_2$ has $[is\_max\_element_{i,2}]=([count_{i,2}]==0)$. Note that $[is\_max\_element_{i,1}]$ and $[is\_max\_element_{i,2}]$ can be additive secret shares in $Z_2$.

The computing system $MPC_1$ can calculate $[max\_v_i]$ by $[max\_v_1]=\Sigma_i[v_{1,i}]\times[is\_max\_element_1]$. The computing system $MPC_1$ can also calculate $[max\_element_1]$ by $[max\_element_1]=\Sigma_i([element_{i,1}]\times[is\_max\_element_{i,1}])$ Similarly, computing system $MPC_2$ can calculate $[max\_v_2]$ by $[max\_v_2]=\Sigma_i[v_{i,2}]\times[is\_max\_element_{i,2}]$. The computing system $MPC_2$ can also calculate $[max\_element_2]$ by $[max\_element_2]=\Sigma_i([element_{i,2}]\times[is\_max\_element_{i,2}])$.

To increase the efficiency of these comparison operations, the MPC cluster 130 can use a divide-and-conquer algorithm. To do so, the MPC cluster 130 can divide the elements of the arrays into groups, e.g., into $\sqrt{N}$ groups, where each group contains $\sqrt{N}$ elements. Without using divide-and-conquer, the solution can require six rounds of communication between computing systems $MPC_1$ and $MPC_2$. The comparison test phase can require comparisons of N×(N-1)/2 pairs of secret shares. The equality test phase can require N equality tests.

Using divide-and-conquer with $\sqrt{N}$ groups, each simpler problem can be solved by three rounds of comparison tests and three rounds of equality tests for a total of six rounds. The result of each simpler problem can be combined into another simpler problem of size $\sqrt{N}$ that can be solved by three rounds of comparison tests and three rounds of equality tests for a total of six rounds.

As described above, the selection value for a digital component can be determined based on three vectors, the contextual vector $V_{context}$ for the digital component, the user group-based vector $V_{ug}$ for the digital component, and a user vector $V_{user}$ representing a user profile of a user. A cohort identifier can be calculated by the application 112 with an algorithm chosen by the application developer (e.g., browser developer) for the entire digital component distribution industry. A cohort identifier algorithm is not customizable by individual content platforms or digital component providers. In this example, the MPC cluster 130 can calculate the selection value for a digital component using the three vectors as selection value=Cap($V_{ug} \cdot V_{context} \cdot V_{user}, max_{sv}, min_{sv}$), where max is the max selection value, min is the minimum selection value such that the resulting selection value is between the maximum and minimum. The dot product between the three vectors can be calculated as $\Sigma_i(v_{ug,i} \times v_{context,i} \times v_{user,i})$, where i is the index of the vectors.

In some situations, the publisher amount after sharing is considered privacy sensitive, e.g, if the amount is derived from a cross-domain user profile as described above using the user vector $V_{user}$. In such cases, it may be desirable to prevent each server of the MPC cluster 130 from accessing the publisher amount in cleartext. Without the amount in cleartext, the MPC cluster 130 may not be able to order the selection values, as described above. In this example, to determine whether a digital component is a candidate, computing system $MPC_1$ can receive the equivalent of an array of secret shares for the cuckoo filter table M denoted by $[M_1]$. Each user group identifier ug_id, if present in M, will be in one of the N possible locations.

Define ug_id(dc) as the function to retrieve the user group identifier ug_id corresponding to a digital component dc for which information is stored by the MPC cluster 130. Also define $\{F_1, \ldots F_N\}$ as the function to calculate a possible index of an item within the cuckoo filter table A.

The computing system $MPC_1$ calculates $[match\_ugd_{c1,1}]$, as $([M_{F_i(ug\_id(dc)),1}]==PRF(ug\_id(dc), nonce_{tag})$, where i∈[1, N]. Similarly, computing system $MPC_2$ calculates $[match\_ug_{dc, 2,i}]$ as $([M_{F_i(ug\_id(dc)),2}]==PRF(ug\_id(dc), nonce_{tag})$, where i∈[1, N]. Note that $[M_{i,2}]$=PRF $(nonce_{secret\_share,i})$, where $nonce_{secret\_share}$ is a parameter in the digital component request received from the client device 110, encrypted by a public key of computing system $MPC_2$. The secret shares $[match\_ug_{dc,1,i}]$ and $[match\_ug_{dc,1,i}]$ are either zero or one, were $match\_ug_{dc,i}=[match\_ug_{dc,1,i}]$ bitwise_xor $[match\_ug_{dc,2,i}]$ is one if the user group identifier for the digital component dc matches the i-th possible location in the cuckoo filter, or is zero otherwise. Also, note that $match\_ug_{dc}=match\_ug_{dc,1}$ or $match\_ug_{dc,2} \ldots$ or $match\_ug_{dc,N}$ is true (with high probability depending on the length of tags in the cuckoo filter) if and only if the digital component dc corresponds to a user interest group identifier of a user group that includes the user as a member.

The above-described techniques can also be modified to support recency and other per user group level signals. Interest Group recency, i.e., how recently was the user added to the user group, can be an important signal to decide selection values. For example, the value of using user group membership to distribute a digital component can drop by half if the use was added to the remarketing list more than eight hours ago. To enable precise selection values based on recency without weakening the security and privacy guarantee, the cryptographic techniques described above can be modified such that each content platform bucketizes the recency into a small number of buckets, e.g., four time period based buckets. For each bucket, the content platform can define a vector for the dot product computations described above.

When generating a digital component request to the MPC cluster 130, the application 112 can, for each user group that includes the user as a member, combine the recency bucket information with the user group identifier to create an augmented user group identifier, e.g., HMAC(ug_id, recency_bucket_id), where recency_bucket_id is an identifier for the recency bucket corresponding to when the user was added to the user group ug_id. For example, if the user was added to the user group two hours ago, the augmented user group identifier can be based on the identifier for recency bucket for a time period of 1-3 hours before a current time. The application then inserts the augmented user group identifier into the cuckoo filter instead of the original user group identifier. The application 112 then splits the Cuckoo filter into two secret shares for each one of the two servers in the MPC cluster 130.

Upon receiving the contextual response, for each cached digital component and each valid recency bucket identifier, the MPC cluster 130 calculates the publisher amount in cleartext with the dot product technique described above. MPC cluster 130 then inserts the digital component and the calculated publisher amount into a list. The MPC cluster 130 inserts any selection values received with contextual response in the same list as well, and sorts the list from the highest to the lowest based on publisher amount. The list size is proportional to the average cardinality of recency buckets. For example, if there are 1,000 cached digital components, and on average each cached digital component has four recency buckets, this will create a publisher amount list of size 4,000.

The MPC cluster 130 calculates the corresponding augmented user group identifier, then relies on the secret share equality test algorithm to check whether the augmented user group identifier is in the cuckoo filter to determine whether the cached digital component and the corresponding selection value (e.g., publisher amount) is eligible for the selection process.

Similarly, the same method can support other low entropy per-user group user level signals. For example, if the user group is about users with electronics left in shopping carts, the user level signal could be bucketed value of the electronics, e.g., low/medium/high amount.

Figure 6:
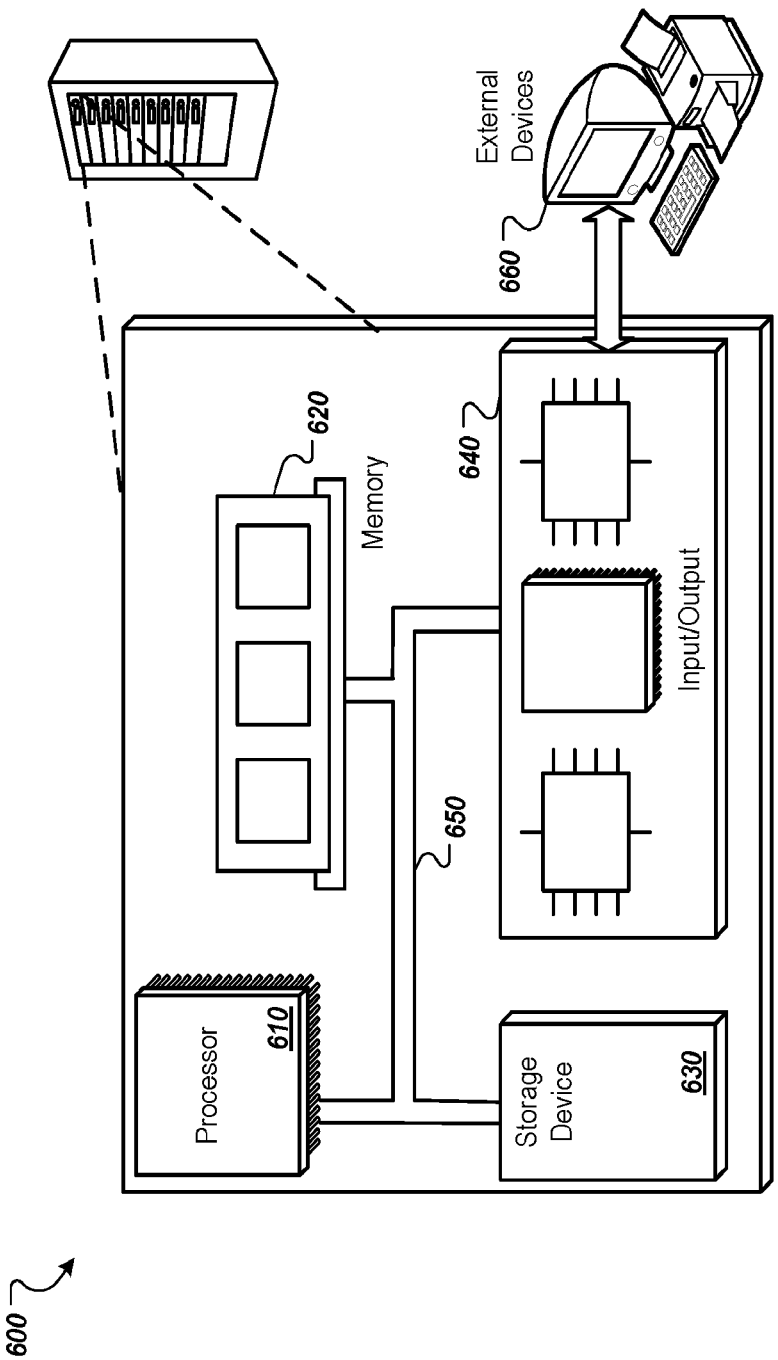
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 5620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, from a client device and by a first computing system of a plurality of multi-party computation (MPC) systems, a digital component request comprising first secret shares of data identifying user groups that include a user of the client device as a member and a set of contextual signals;
transmitting, by the first computing system, a contextual digital component request to a content platform;
receiving, by the first computing system and from the content platform, selection data for a plurality of digital components, wherein the selection data comprises first vector data defining a contextual-based vector of values selected based at least in part on the set of contextual signals;

obtaining, by the first computing system and for each of the plurality of digital components, second vector data defining a user group-based vector of values selected based at least in part on a respective user group corresponding to the digital component;

determining, by the first computing system, a selection value for each digital component based on the first vector data and the second vector data;

determining, for each digital component, a candidate parameter that indicates whether the respective user group identifier corresponding to the digital component matches a user group that includes the user as a member;

generating, based on the selection values and the candidate parameters, a first secret share of a selection result that identifies, from a plurality of candidate digital components, a given digital component having a highest selection value, wherein each candidate digital component is a digital component for which the candidate parameter for the selection value corresponding to the digital component indicates that the respective user group identifier corresponding to the selection value matches a user group that includes the user as a member; and transmitting, to the client device, the first secret share of a selection result identifying the given digital component.

2. The computer-implemented method of claim 1, wherein determining, by the first computing system, the selection value for each digital component based on the first vector data and the second vector data comprises determining a dot product of the contextual-based vector of values for the digital component and the user group-based vector of values.

3. The computer-implemented method of claim 1, wherein the first vector data comprises first secret shares of the contextual-based vector of values and the second vector data comprises first secret shares of the user group-based vector of values.

4. The computer-implemented method of claim 3, wherein determining, by the first computing system, the selection value for each digital component based on the first vector data and the second vector data comprises collaborating with one or more second computing systems of the plurality of MPC systems to perform a secure MPC process to determine a dot product of the contextual-based vector of values for the digital component and the user group-based vector of values.

5. The computer-implemented method of claim 1, wherein the selection value for each digital component is based on a user profile for the user.

6. The computer-implemented method of claim 5, wherein determining, by the first computing system, the selection value for each digital component based on the first vector data and the second vector data comprises determining a dot product of the contextual-based vector for the digital component, the user group-based vector for the digital component, and a user profile vector for the user profile for the user.

7. The computer-implemented method of claim 1, wherein determining the candidate parameter for each selection value comprises determining a first secret share of the candidate parameter for each selection value.

8. The computer-implemented method of claim 1, wherein generating the first secret share of the selection result comprises:

generating an order of the selection values based on a magnitude of each selection value;

determining, based on the order of the selection values and the candidate parameter for each selection value, a first secret share of an accumulated value for each selection value;

determining, for each selection value, a first secret share of a winner parameter based on (i) the candidate parameter for the selection value and (ii) a result of an equality test that indicates whether the accumulated value for the selection value is a specified value; and determining, as the first secret share of the selection result, a first secret share of a sum of, for each selection value, a product of the winner parameter for the selection value and a digital component information element for the selection value.

9. The computer-implemented method of claim 8, wherein determining the first secret share of the accumulated value for each selection value comprises:

for each individual selection value, determining a quantity of selection values, between a highest selection value and the individual selection value inclusive, that have a candidate parameter that indicates that the respective user group identifier corresponding to the selection value matches a user group that includes the user as a member.

10. A system comprising:

a first computing system comprising one or more processors; and one or more storage devices storing instructions that, when executed by the one or more processors, cause the one or more processor to perform operations comprising:

receiving, from a client device and by the first computing system of a plurality of multi-party computation (MPC) systems, a digital component request comprising first secret shares of data identifying user groups that include a user of the client device as a member and a set of contextual signals;

transmitting, by the first computing system, a contextual digital component request to a content platform;

receiving, by the first computing system and from the content platform, selection data for a plurality of digital components, wherein the selection data comprises first vector data defining a contextual-based vector of values selected based at least in part on the set of contextual signals;

obtaining, by the first computing system and for each of the plurality of digital components, second vector data defining a user group-based vector of values selected based at least in part on a respective user group corresponding to the digital component;

determining, by the first computing system, a selection value for each digital component based on the first vector data and the second vector data;

determining, for each digital component, a candidate parameter that indicates whether the respective user group identifier corresponding to the digital component matches a user group that includes the user as a member;

generating, based on the selection values and the candidate parameters, a first secret share of a selection result that identifies, from a plurality of candidate digital components, a given digital component having a highest selection value, wherein each candidate digital component is a digital component for which the candidate parameter for the selection value corresponding to the digital component indicates that the respective user group identifier corresponding to the selection value matches a user group that includes the user as a member; and transmitting, to the client device, the first secret share of a selection result identifying the given digital component.

11. The system of claim 10, wherein determining, by the first computing system, the selection value for each digital component based on the first vector data and the second vector data comprises determining a dot product of the contextual-based vector of values for the digital component and the user group-based vector of values.

12. The system of claim 10, wherein the first vector data comprises first secret shares of the contextual-based vector of values and the second vector data comprises first secret shares of the user group-based vector of values.

13. The system of claim 12, wherein determining, by the first computing system, the selection value for each digital component based on the first vector data and the second vector data comprises collaborating with one or more second computing systems of the plurality of MPC systems to perform a secure MPC process to determine a dot product of the contextual-based vector of values for the digital component and the user group-based vector of values.

14. The system of claim 10, wherein the selection value for each digital component is based on a user profile for the user.

15. The system of claim 14, wherein determining, by the first computing system, the selection value for each digital component based on the first vector data and the second vector data comprises determining a dot product of the contextual-based vector for the digital component, the user group-based vector for the digital component, and a user profile vector for the user profile for the user.

16. The system of claim 10, wherein determining the candidate parameter for each selection value comprises determining a first secret share of the candidate parameter for each selection value.

17. The system of claim 10, wherein generating the first secret share of the selection result comprises:

generating an order of the selection values based on a magnitude of each selection value;

determining, based on the order of the selection values and the candidate parameter for each selection value, a first secret share of an accumulated value for each selection value;

determining, for each selection value, a first secret share of a winner parameter based on (i) the candidate parameter for the selection value and (ii) a result of an equality test that indicates whether the accumulated value for the selection value is a specified value; and determining, as the first secret share of the selection result, a first secret share of a sum of, for each selection value, a product of the winner parameter for the selection value and a digital component information element for the selection value.

18. The system of claim 17, wherein determining the first secret share of the accumulated value for each selection value comprises:

for each individual selection value, determining a quantity of selection values, between a highest selection value and the individual selection value inclusive, that have a candidate parameter that indicates that the respective user group identifier corresponding to the selection value matches a user group that includes the user as a member.

19. A non-transitory computer storage medium encoded with instructions that, when executed by a first computing system, cause the first computing system to perform operations comprising:

receiving, from a client device and by the first computing system of a plurality of multi-party computation (MPC) systems, a digital component request comprising first secret shares of data identifying user groups that include a user of the client device as a member and a set of contextual signals;

transmitting, by the first computing system, a contextual digital component request to a content platform;

receiving, by the first computing system and from the content platform, selection data for a plurality of digital components, wherein the selection data comprises first vector data defining a contextual-based vector of values selected based at least in part on the set of contextual signals;

obtaining, by the first computing system and for each of the plurality of digital components, second vector data defining a user group-based vector of values selected based at least in part on a respective user group corresponding to the digital component;

determining, by the first computing system, a selection value for each digital component based on the first vector data and the second vector data;

determining, for each digital component, a candidate parameter that indicates whether the respective user group identifier corresponding to the digital component matches a user group that includes the user as a member;

generating, based on the selection values and the candidate parameters, a first secret share of a selection result that identifies, from a plurality of candidate digital components, a given digital component having a highest selection value, wherein each candidate digital component is a digital component for which the candidate parameter for the selection value corresponding to the digital component indicates that the respective user group identifier corresponding to the selection value matches a user group that includes the user as a member; and transmitting, to the client device, the first secret share of a selection result identifying the given digital component.

20. The non-transitory computer storage medium of claim 19, wherein determining, by the first computing system, the selection value for each digital component based on the first vector data and the second vector data comprises determining a dot product of the contextual-based vector of values for the digital component and the user group-based vector of values.

* * * * *